United States Patent

[11] 3,611,307

[72] Inventors Albert Podvin
Woodland Hills, Calif.;
Michael J. Flynn, Evanston, Ill.

[21] Appl. No. 813,024
[22] Filed Apr. 3, 1969
[45] Patented Oct. 5, 1971
[73] Assignee International Business Machines Corporation
Armonk, N.Y.

[54] EXECUTION UNIT SHARED BY PLURALITY OF ARRAYS OF VIRTUAL PROCESSORS
10 Claims, 10 Drawing Figs.

[52] U.S. Cl. .......... 340/172.5
[51] Int. Cl. .......... G06f 9/18
[50] Field of Search .......... 340/172.5; 235/157

[56] References Cited
UNITED STATES PATENTS

| | | | |
|---|---|---|---|
| 3,312,954 | 4/1967 | Bible et al. | 340/172.5 |
| 3,317,898 | 5/1967 | Hellerman | 340/172.5 |
| 3,346,851 | 10/1967 | Thornton et al. | 340/172.5 |
| 3,421,150 | 1/1969 | Quosig et al. | 340/172.5 |

*Primary Examiner*—Gareth D. Shaw
*Attorneys*—Peter P. Leal and Hanifin and Jancin

ABSTRACT: A multiplicity of arrays of digital machines, said machines time sharing a single execution unit having multiple execution facilities is disclosed. A digital machine is termed a virtual processor and can be defined as a basic digital computer, absent an execution unit, secondary control and storage unit. The arrays of virtual processors time share a common execution unit. Selection means associated with each array sequentially sample each virtual processor in its given time slot. If a given virtual processor requests service during its time slot, its request becomes a candidate for presentation to the execution unit. Since there are a multiplicity of arrays, there may be a multiplicity of service requests during a given time slot. A priority controller determines priority among the arrays such that the highest priority array having a currently sampled virtual processor requesting service will gate its service request and associated operands to the execution unit. Means are provided for gating the results of the requested service back to the requesting virtual processor.

INVENTORS.
ALBERT PODVIN
MICHAEL J. FLYNN
BY Peter R. Leal
ATTORNEY

NORMAL OPERATION

| | PRIORITY COUNTER PHASE | ARRAY COUNTERS' PHASE | ARRAY REQUEST STATUS $A_0$ $R_0$ LINE 102 | $A_1$ $R_1$ LINE 104 | $A_2$ $R_2$ LINE 106 | $A_3$ $R_3$ LINE 108 | NOMINAL ARRAY PRIORITY | ACTUAL ARRAY PRIORITY |
|---|---|---|---|---|---|---|---|---|
| 1 | | | 1 | X | X | X | | 0 |
| 2 | 0 | X | 0 | 1 | X | X | 0 | 1 |
| 3 | | | 0 | 0 | 1 | X | | 2 |
| 4 | | | 0 | 0 | 0 | 1 | | 3 |
| 5 | | | X | 1 | X | X | | 1 |
| 6 | 1 | X | X | 0 | 1 | X | 1 | 2 |
| 7 | | | X | 0 | 0 | 1 | | 3 |
| 8 | | | 1 | 0 | 0 | 0 | | 0 |
| 9 | | | X | X | 1 | X | | 2 |
| 10 | 2 | X | X | X | 0 | 1 | 2 | 3 |
| 11 | | | 1 | X | 0 | 0 | | 0 |
| 12 | | | 0 | 1 | 0 | 0 | | 1 |
| 13 | | | X | X | X | 1 | | 3 |
| 14 | 3 | X | 1 | X | X | 0 | 3 | 0 |
| 15 | | | 0 | 1 | X | 0 | | 1 |
| 16 | | | 0 | 0 | 1 | 0 | | 2 |
| 17 | | | 1 | X | X | X | | 0 |
| 18 | 0 | X | 0 | 1 | X | X | 0 | 1 |
| 19 | | | 0 | 0 | 1 | X | | 2 |
| 20 | | | 0 | 0 | 0 | 1 | | 3 |

| | OPERATION | | | | |
|---|---|---|---|---|---|
| | EXTENDED PRIORITY | | | | NORMAL |
| $E_0$ | 1 | 0 | 0 | 0 | 0 |
| $E_1$ | 0 | 1 | 0 | 0 | 0 |
| $E_2$ | 0 | 0 | 1 | 0 | 0 |
| $E_3$ | 0 | 0 | 0 | 1 | 0 |
| $I_0$ | * | * | * | * | 1 |
| $I_1$ | * | * | * | * | 1 |
| $I_2$ | * | * | * | * | 1 |
| $I_3$ | * | * | * | * | 1 |

$$* \begin{cases} I_0 = (\text{PRIORITY COUNTER PHASE 0}) \cdot (E_1 \cdot \overline{R_1} + E_2 \cdot \overline{R_2} + E_3 \cdot \overline{R_3}) + (\overline{E_0} \cdot \overline{E_1} \cdot \overline{E_2} \cdot \overline{E_3}) \\ I_1 = (\text{PRIORITY COUNTER PHASE 1}) \cdot (E_0 \cdot \overline{R_0} + E_2 \cdot \overline{R_2} + E_3 \cdot \overline{R_3}) + (\overline{E_0} \cdot \overline{E_1} \cdot \overline{E_2} \cdot \overline{E_3}) \\ I_2 = (\text{PRIORITY COUNTER PHASE 2}) \cdot (E_0 \cdot \overline{R_0} + E_1 \cdot \overline{R_1} + E_3 \cdot \overline{R_3}) + (\overline{E_0} \cdot \overline{E_1} \cdot \overline{E_2} \cdot \overline{E_3}) \\ I_3 = (\text{PRIORITY COUNTER PHASE 3}) \cdot (E_0 \cdot \overline{R_0} + E_1 \cdot \overline{R_1} + E_2 \cdot \overline{R_2} + (\overline{E_0} \cdot \overline{E_1} \cdot \overline{E_2} \cdot \overline{E_3}) \end{cases}$$

FIG. 2C

EXECUTION UNIT SHARED BY PLURALITY OF ARRAYS OF VIRTUAL PROCESSORS

BACKGROUND OF THE INVENTION

1. Field of the Invention

This invention relates to apparatus for use in a multiple instruction stream, multiple data stream computer system. More particularly, this invention relates to an improved combination of digital apparatus useful in enhancing the throughout of parallel processing computing systems.

2. Description of the Prior Art

The complexities of modern life have generated the need for the electronic processing of vast amounts of data. This need has triggered the development of large-scale, ultrafast, electronic digital computer systems which process these vast amounts of data by processing sequences of instructions within the computer system. To meet the ever-increasing needs of data processing, speed in processing instructions is of essence. To meet the demands in speed, work has recently been done in the area of parallel processing. Such work includes systems wherein a multiplicity of computers time-share a single execution having multiple-execution facilities. Examples of some of the early work of this type can be seen in the papers 'Time-Phased Parallelism' by R. A. Aschenbrenner, *Proceedings of the National Electronics Conference*, Vol. XXIII, 1967, pages 709–712; and 'Intrinsic Multiprocessing' by R. A. Aschenbrenner, M. J. Flynn, and G. A. Robinson, *Proceedings of the Spring Joint Computer Conference*, 1967, pages 81–86.

However, while suitable for some applications, such prior art systems suffer from the drawback of inability to achieve a high efficiency of utilization of the facilities in the execution unit. Such prior art systems often utilize a sequential polling technique for sending requests to the execution unit with attendant slowdown when several processors during a polling sequence fail to have requests ready.

Accordingly, it is the general object of this invention to provide an improved means for allowing a multiplicity of digital processors to efficiently share a single execution unit.

A more particular object of this invention is to provide means in a multi-instruction stream, multidata stream digital computer systems for allowing arrays of virtual processors to time-share a single execution unit.

A still more particular object of this invention is to provide means in a multi-instruction stream, multidata stream digital computer system for controlling the priority of arrays of virtual processors time sharing a single execution unit.

SUMMARY OF THE INVENTION

Apparatus is disclosed for allowing virtual processors in a multi-instruction stream, multidate stream digital computer system to more efficiently time share a single pipelined execution unit. The term "virtual processor" may be defined as a basic digital computer, absent an execution unit, secondary control and storage unit. In our invention a number of arrays of virtual processors time share a pipelined execution unit with array priority being controlled on a precessing basis by a priority control apparatus. Each array has associated therewith a sampling means for sampling the request status of each virtual processor in the array. This sampling means may be a ring counter or other suitable device. For example, each time the ring counter associated with particular array counts 1, a time slot is generated for sampling the corresponding virtual processor to see if it has a request for service. Since there are a number of arrays, there may be a number of requests for service occuring coincidentally, up to a maximum of one request per array. During each time slot a particular array is selected by the priority controller to send its request to the execution unit. If the selected array has no service request during that time slot, priority is transferred during this same time slot to a lower array in the priority scheme. Means are provided by the priority apparatus for continuing this sampling scheme until an array is found having an outstanding service request. If no array has an outstanding service request, then priority is passed to the next highest array during the next time slot and the selection begins again.

Primary among the advantages of our invention is the more efficient usage of a time-shared execution unit as compared to previous multi-instruction stream, multidata stream computing systems. Due to the new combination of arrays of virtual processors under priority control, each of the totality of virtual processors in the system has an enhanced probability of receiving early service from the execution unit.

BRIEF DESCRIPTION OF THE DRAWINGS

FIG. 2C is a table showing the relationship between the logical states of inhibit and excite lines used in the priority controller of our invention.

DESCRIPTION OF THE PREFERRED EMBODIMENT

Structure of the Invention

Figure 1:
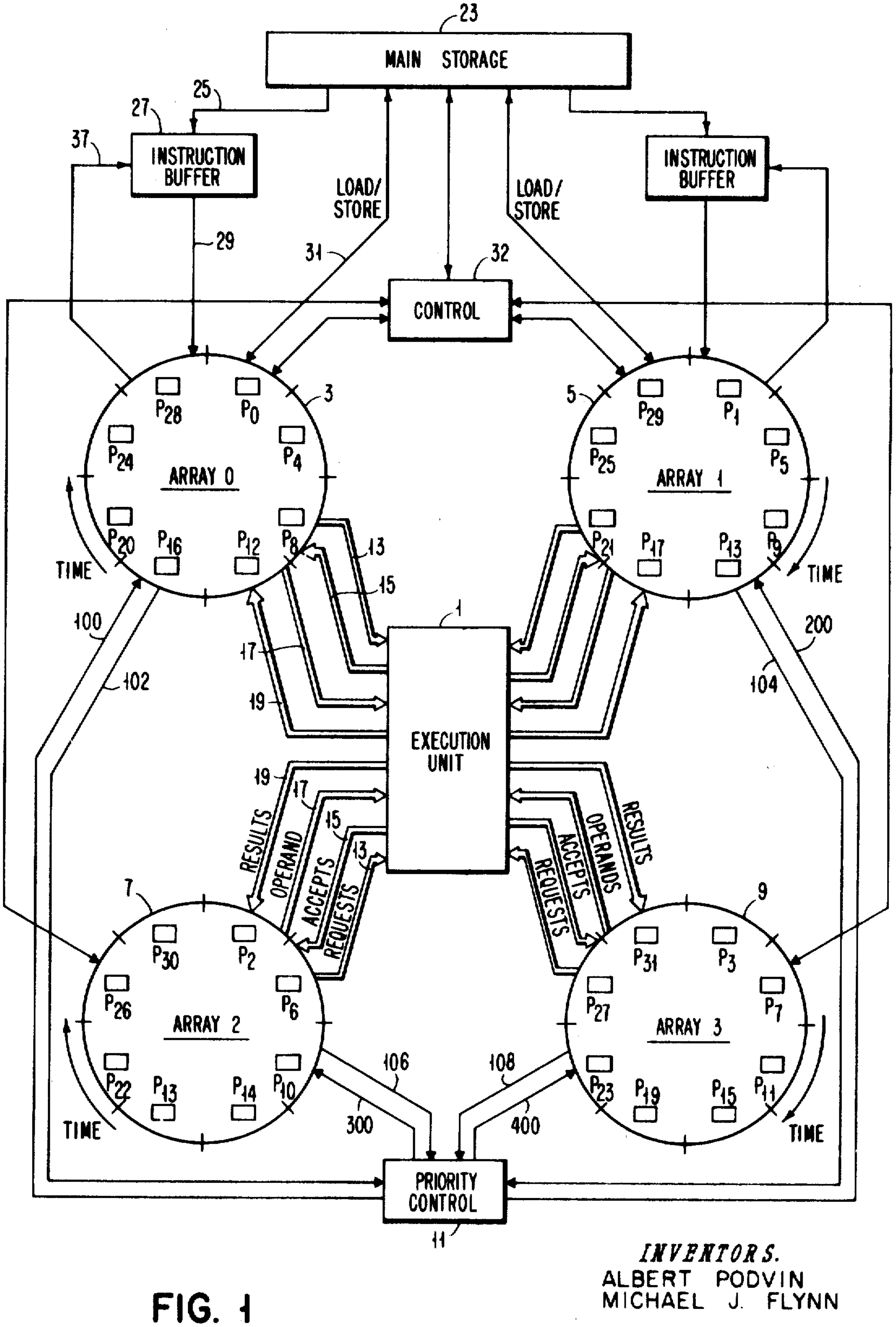
FIG. 1 is a block diagram of our invention showing a number of arrays of virtual processors along with the time-shared execution unit and the priority controller.

The structure of an embodiment of our invention will now be explained. With reference to FIG. 1 there are seen four arrays, 3, 5, 7, and 9, of virtual processors. As can be seen, each of the four arrays has been associated therewith eight virtual processors. It will be recognized by those skilled in the art that the number of arrays shown in FIG. 1 and the number of virtual processors associated therewith are for illustrative purposes only and can be modified according to the designer's choice without departing from the spirit and the scope of our invention. With continued reference to FIG. 1 and with particular reference to the arrays 3, 5, 7, and 9, it is seen that each array is named, for example, array 0 through array 3. In numerical order, the processors of each array are named P , P , $P_2$, $P_3$,...,$P_{31}$. Since there are four arrays, the designations of the virtual processors of a given array are spaced by four numbers for ease of description. Thus, the processors for array 0 are designated $P_0$, $P_4$,...,$P_{28}$.

For the present embodiment it is presumed for illustrative purposes only that latency in the execution unit, that is, the total time needed to complete a given operation from the presentation of operands to the production of result, is 64 nanoseconds. All execution units are heavily staged or pipelined for maximum bandwith. Each virtual processor can be viewed as the basic registers of a central processing unit, absent execution facilities, secondary control and storage unit. Each processor is responsible for fetching its own operands, and preparing its own instructions. It does not execute the instruction, with the exception of load/store/branch, but rather requests the execution unit to do so. All processors in a given array are closely time synchronized, and no two processors within an array are in the same phase of instruction preparation or execution at the same time. Each virtual processor is phased by 8 nanoseconds, for this illustration, from either of its neighbors. As seen by the execution unit, then, each virtual processor has an 8 nanosecond slot in which it can request service on a request bus 13. Operands are sent from the individual virtual processor over the array operands bus 17 to the execution unit concurrently with the request sent over bus 13. In a separate accept bus 15, each virtual processor is informed from the execution area whether or not its request was accepted. If accepted, the results would be returned on results bus 19, 64 nanoseconds later.

Figure 2:
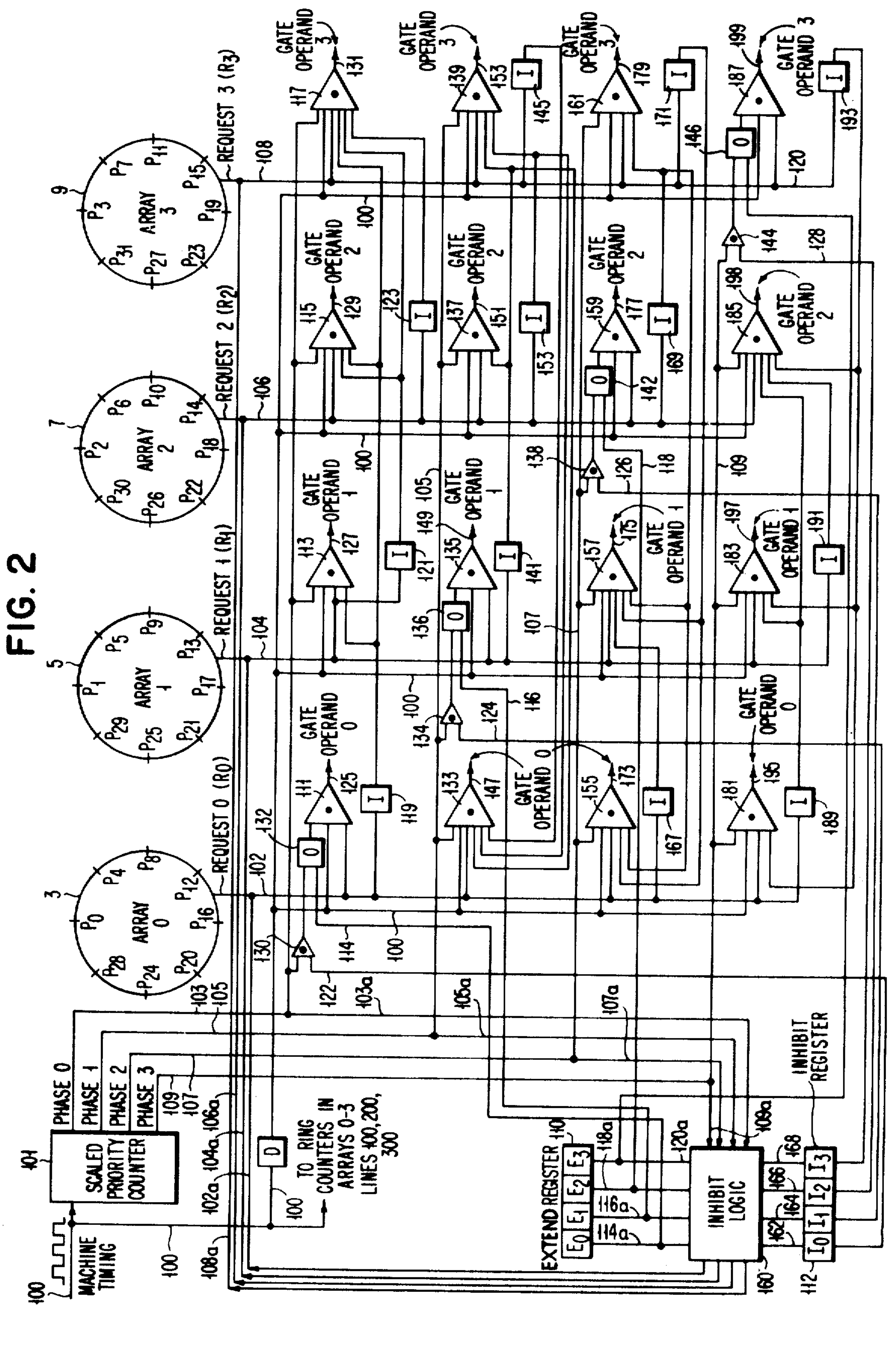
FIG. 2 is a representation of a priority controller useful in our invention.
Figure 3:
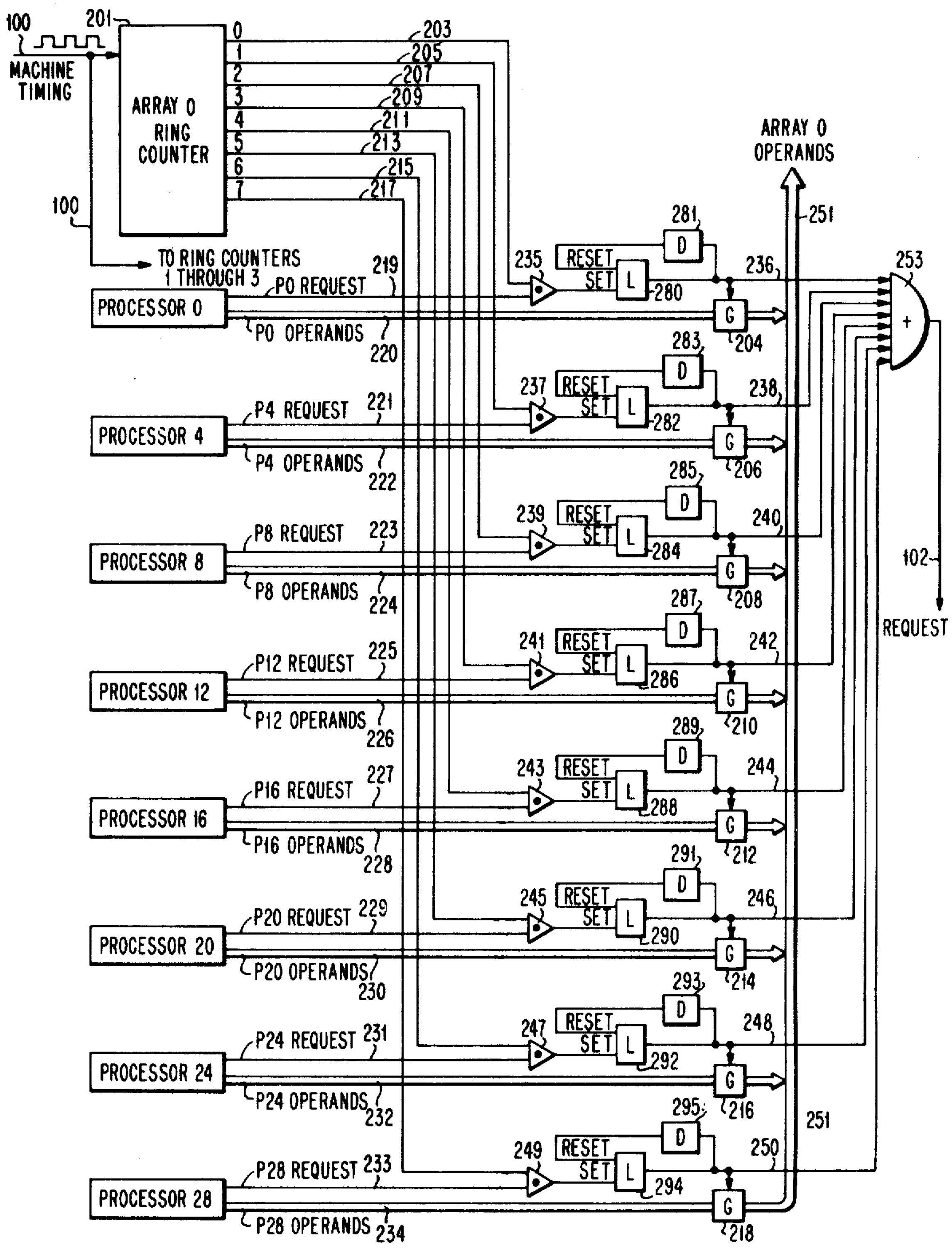
FIG. 3 is a representation of a typical array of virtual processors.

FIG. 3 shows a typical array of processors, in this case array 0. Each array has a ring counter such as 201. In the present example each array has eight processors and each ring counter, such as 210, has eight positions, 0 through 7. The ring counter used may be any well-known ring counter such as that shown in the text, "Arithmetic Operations in Digital Computers," R. K. Richards, D. Van Nostrand Company, 1955, pp. 205–8. Machine timing pulses are sent to ring counter 201 via line 100. Line 100 also sends machine timing pulses to the ring counters in each of the other arrays, as indicated by the extension of line 100 in FIG. 2. It is assumed for the present example that the machine timing pulses will cause all ring counters 0–3 to count at a repetition rate of 8 nanoseconds, each beginning at array counter phase 0. Thus, the output of the ring counter 201 is over lines 203, 205,...,217 of FIG. 3. The ring counter in each array is initialized at the same phase. Therefore, when ring counter 0 is in phase 0, the ring counter in each of the other arrays will also be at phase 0, and so on. Lines 203–217 will each be activated once every 64 nanoseconds and a new line will be activated every 8 nanoseconds in sequence. Request lines 219, 221,...,233 are connected from each processor to its respective sampling AND-gate 235, 237,...,249. Each virtual processor also has a bus such as 220, 222,...,234 for transmitting its operands to the execution unit. Each of the above operand buses are connected individually via gates 204, 206,...,218 to an operand bus 251 for array 0. Each of the above gates can be respectively activated by lines 236, 238,...,250 connected from AND-gates 235, 237,...,249 via latches 280, 282,...,294. Each latch is reset via its respective delay 281, 283,...,295 of suitable period to allow a gating pulse to be formed on line 236. Lines 236 through 250 are also connected to OR-gate 253. If any virtual processor in a given array has a service request outstanding during its selection phase, OR-gate 253 will therefore be activated to produce a service request signal on Request 0 ($R_0$) line 102. The structure of arrays 1–3 in similar to that of array 0.

Figures 4, 5:
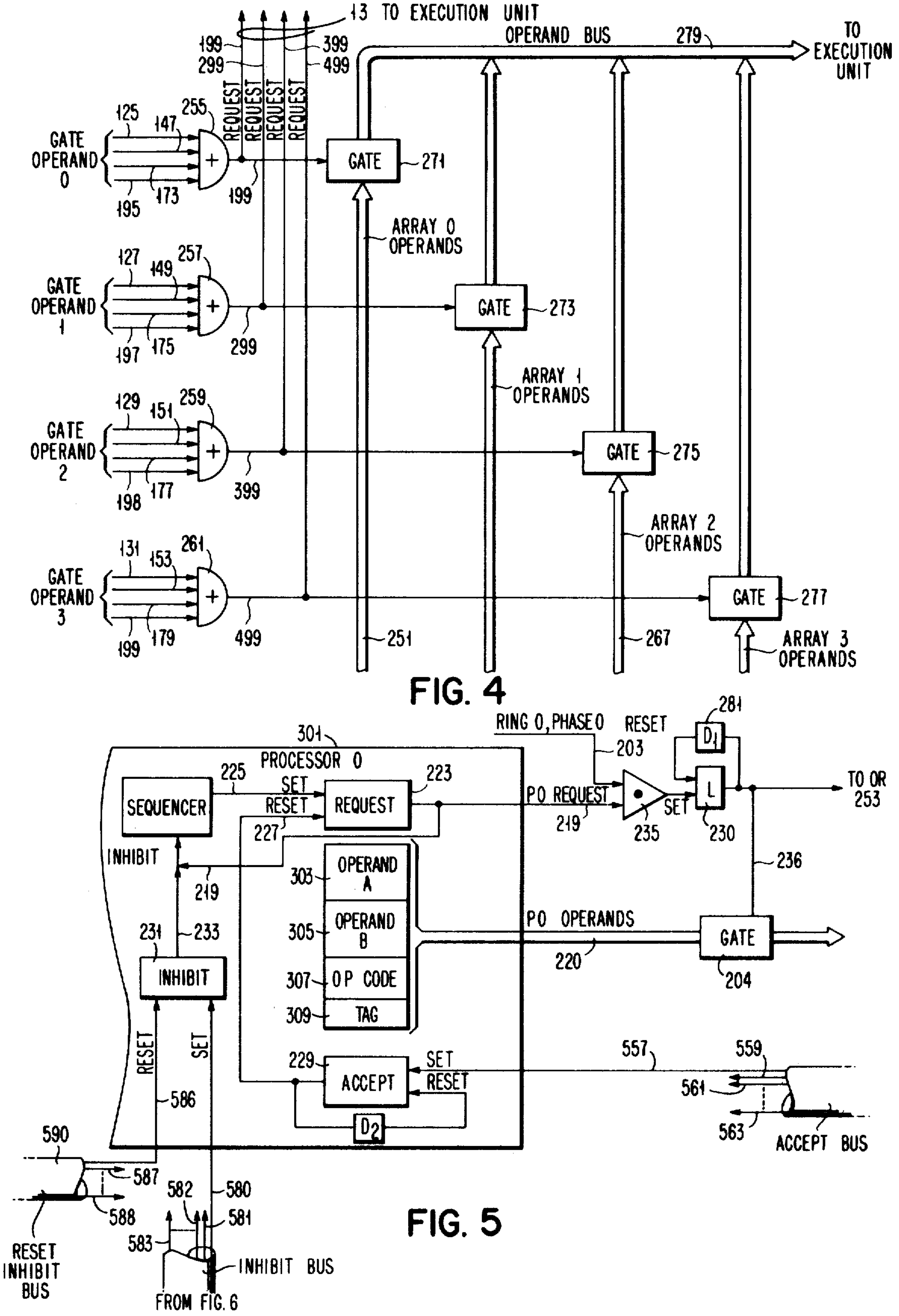
FIG. 4 is the representation of a manner in which operand buses can be configured for transmission of operands to the time-shared execution unit.
FIG. 5 is a representation of part of a virtual processor showing the manner in which operands can be gated to the operand bus.

The outgating area of a typical virtual processor such as virtual processor 0 may be structured as seen in FIG. 5. Register means 303, 305, 307, 309 settable from the instruction stream and data stream, not shown, are connected to the $P_0$ operand bus 220 originally seen in FIG. 3. Also shown is request flip-flop 223 settable via set line 225 from sequencing means within the machine when a new request is ready. Request flip-flop 223 is resettable via line 227 from accept flip-flop 229. The set output of request flip-flop 223 is $P_0$ Request Line 219 connected as an enabling input to sampling AND-gate 235. Another enabling input to AND-gate 235 is line 203 which carries the input from array 0, ring counter 201, phase 0. The output of AND-gate 235 sets latch 280 to enable line 236 which serves as a gating input to gate 204 and also as an input to the OR-gate 253, as originally seen in FIG. 3. The accept bus seen in FIG. 5 is connected from the execution unit to each of the virtual processors. For example, line 557 is an accept line connected to virtual processor $P_0$ which sets accept flip-flop 229 to allow line 227 to reset the request latch so that the next request can be set in sequence. If an outstanding request is not accepted, the output of request flip-flop 223 will serve to inhibit the next the direction from the sequencer by activating the inhibit line via line 219.

It may occur that certain instructions require longer than the 64 nanoseconds latency period postulated above. For example, a divide instruction, being generally a more time-consuming instruction than average, may require more than 64 nanoseconds latency. In this case, the inhibit bus seen in FIG. 5 and emanating from the execution unit provides a line to each virtual processor to inhibit the next request until the results of a requested divide are returned. As seen in FIG. 5, line 580 will set inhibit flip-flop 231 so that line 233 activates the inhibit line to the sequencer to inhibit the processing of further requests until the divide operation has been completed for that particular virtual processor.

Turning now to FIG. 2, there is seen a detailed representation of a priority controller which was shown generally at 11 in FIG. 1. In FIG. 2 is seen scaled priority counter 101, as well as associated gating and inverting means and associated signal lines. Machine timing pulses at the assumed 8 nanoseconds repetition rate are fed over line 100 as indicated. Scaled priority counter 101 counts once each eight pulses. Other ratios may be used without departing from the spirit and scope of the invention. In the present example, the scaled priority counter counts once for every 64 nanoseconds, or eight machine timing pulses, and is synchronized with the counter in each array. Thus, for every eight counts of each array counter, the priority counter 101 changes one phase. Each phase of the priority counter defines a nominal array priority and therefore nominal array priority is changed once each sampling "revolution" of the arrays, as will subsequently be made more clear. The phase relationship between scaled ring priority counter 101 and the array counters is seen graphically in FIG. 2A. Scaled priority counter 101 operates as a ring counter so that the end of phase 3, phase 0 begins again. Such a scaled counter 101 is well known to those skilled in the art and will not be described in detail here. Such a counter 101 can be realized by feeding the pulses of line 100 to a counter which emits one pulse for every eight machine timing pulses and using the output of this counter as an input to a four-position ring counter. The outputs of this latter counter will then be phases 0–3 on lines 103, 105, 107, 109.

As will subsequently be made clear, the priority controller can be made to operate in more than one mode. For example, a Normal mode and an Extended Priority mode can be defined.

With continued reference to FIG. 2, there is seen Extend Register 110 and Inhibit Register 112. Extend Register 110 has positions $E_0$, $E_1$, $E_2$, $E_3$ settable to the zero or one state by programmer or by supervisory program or other suitable means within control means 32 of FIG. 1, for example. One constraint on the setting of Extend Register 110 is that either all E positions are set to the zero state or else one of the E positions is set to the one state and all the remaining E positions are set to the zero state. Inhibit Register 112 has positions $I_0$, $I_1$, $I_2$, $I_3$ settable to the zero or one state as a function of the states of the positions of the Extend Register, the current priority counter phase, and the condition of the array request lines, $R_0$, $R_1$, $R_2$, $R_3$, a typical one of which was described previously with respect to FIG. 3. Inhibit Register 112 is set by Inhibit Logic 160.

Inhibit Logic 160 has as one set of inputs the value of positions $E_0$, $E_1$, $E_2$, $E_3$ of Extend Register 110 via lines 114*a*, 116*a*, 118*a*, 120*a*. Other inputs include the values of $R_0$, $R_1$, $R_2$, $R_3$ via extensions of Request lines 102, 104, 106, and 108. The Request lines were explained previously by explaining a typical Request line, $R_0$, with respect to FIG. 3. All four request lines are seen in FIG. 2, and their extensions 102*a*, 104*a*, 106*a* and 108*a* form inputs to Inhibit Logic 160. Extensions of the priority counter phase lines, 103*a*, 105*a*, 107*a*, 109*a* are also inputs to Inhibit Logic 160. Inhibit Logic 160 forms output signals which set values into positions $I_0$, $I_1$, $I_2$, $I_3$ of Inhibit Register 112 via lines 162, 164, 166, 168, respectively. The logic can be implemented according to the following logic equations: $I_0$ (Line 162) = (Phase 0) $\cdot (E_1 \cdot \overline{R}_1 + E_2 \cdot \overline{R}_2 + E_3 \cdot \overline{R}_3) + (\overline{E}_0 \cdot \overline{E}_1 \cdot \overline{E}_2 \cdot \overline{E}_3)$ (1)

$I_1$ (Line 164) = (Phase 1) $\cdot (E_0 \cdot \overline{R}_0 + E_2 \cdot \overline{R}_2 + E_3 \cdot \overline{R}_3) + (\overline{E}_0 \cdot \overline{E}_1 \cdot \overline{E}_2 \cdot \overline{E}_3)$ (2)

$I_2$ (Line 166) = (Phase 2) $\cdot (E_0 \cdot \overline{R}_0 + E_1 \cdot \overline{R}_1 + E_3 \cdot \overline{R}_3) + (\overline{E}_0 \cdot \overline{E}_1 \cdot \overline{E}_2 \cdot \overline{E}_3)$ (3)

$I_3$ (Line 168) = (Phase 3) $\cdot (E_0\cdot\bar{R}_0+E_1\cdot\bar{R}_1+E_2\cdot\bar{R}_2)+(\bar{E}_0\cdot\bar{E}_1\cdot\bar{E}_2\cdot\bar{E}_3)$ (4)

The specification of logic equations 1–4 is sufficient to enable one to implant Inhibit Logic 160. For example, line 162 which sets the value of $I_0$ in Inhibit register 112, can be formed by the output of an OR gate having as one input the AND function $\bar{E}_0\cdot\bar{E}_1\cdot E_2\cdot E_3$ and as another input, the AND function (Phase 0)$\cdot(E_1\bar{R}_1+E_2\cdot\bar{R}_2+E_3\cdot\bar{R}_3)$. In implementation, Phase 0 comes from line 103*a*, while the value of $E_1$, $E_2$, and $E_3$ from lines 116*a*, 118*a* and 120*a*, respectively, are individually ANDed with the inverse of $R_1$, $R_2$, $R_3$ from lines 104*a*, 106*a* and 108*a*, respectively, and the results of these individual ANDs are OR'd together to form $(E_1\cdot\bar{R}_1+E_2\cdot\bar{R}_2+E_3\cdot\bar{R}_3)$ which is ANDed with line 103*a*, mentioned above, to form (Phase 0)$\cdot(E_{1a}\cdot\bar{R}_1+E_2\cdot\bar{R}_2+E_3\cdot\bar{R}_3)$. Lines 164, 166, and 168 can be similarly formed. It can be seen from logic equations 1–4 that $I_0$, $I_1$, $I_2$, $I_3$ are concurrently at a one state if positions $E_0$, $E_1$, $E_2$, $E_3$ are concurrently at a zero state, due to the term $(\bar{E}_0\cdot\bar{E}_1\cdot\bar{E}_2\cdot\bar{E}_3)$ in each equation 1–4.

The values of the positions of the Extend Register 110 condition certain gating circuitry of the priority controller via lines 114, 116, 118, 120. The value of the positions of the Inhibit Register 112 condition certain other gating circuitry via lines 122, 124, 126, 128. A precise explanation of these lines in the present embodiment of our invention will be given subsequently. For the present it should be noted generally that the I positions act as inhibiting inputs when in the zero state and as enabling inputs when in the one state.

Briefly, the function of the Extend Register 110 is to enable Normal Operation if all E positions are zero, and to attempt to initiate Extended Priority Operation if one of the E positions is in the one state. In Normal Operation mode, the priority apparatus samples all arrays once each array counter phase. The array having nominal priority is defined by the current priority counter phase. If, during a given array counter phase, the nominal priority array does not have a service request, then the other arrays are cyclically sampled during the time period defined by that given array counter phase and priority is transferred or rotated downwardly to the first array having a service request.

An attempt can be made to override the Normal Operation mode by defining a desired array as having priority regardless of priority counter phase. This is done by setting the position of the priority of the Extend Register which corresponds to the desired array to the one state. If a given E position is set to the one state and the array corresponding to that E position has a service request, then that array has priority and priority remains with it during each array counter phase in which it has a service request. Thus, Normal Operation is overridden and Extended Priority Operation results. On the other hand, if a given E position is set to the one state and the array corresponding to that E position does not have a service request during a given array counter phase, then Normal Operation will result, with nominal priority again being defined by the priority counter phase and cyclically rotated as explained above for normal operation. Thus, with a given E position set to the one state, operation will automatically switch from Normal to Extended Priority and vise versa, depending upon the presence or absence of a service request in the corresponding array during each array counter phase, regardless of the priority counter phase. This will be made more clear by the subsequent operative examples.

With continued reference to FIG. 2, phases 0–3 are transmitted from scaled priority counter 101 over lines 103, 105, 107 and 109.

Phase 0, line 103, is connected as an input to AND 130, the other input to which $I_0$ on line 122, mentioned previously. The output of AND 130 is one input to OR 132, the other input to which is $E_0$ on line 114. The output of OR 132 is an enabling input to AND 111. Phase 0 on line 103 is also connected as enabling inputs to AND-gates 113, 115, 117.

Phase 1, line 105, is connected as an input to AND 134, the other input to which is $I_1$ on line 124, mentioned previously. The output of AND 134 is one input to OR 136, the other input to which is $E_1$ on line 116. The output of OR 136 is an enabling input to AND 135. Phase 1 on line 105 is also connected as enabling inputs to AND-gates 133, 137, 139.

Phase 3, line 107, is connected as an input to AND 138, the other input to which is $I_2$ on line 128. The output of AND 138 is one input to OR 140, the other input to which is $E_2$ on line 118. The output of OR 140 is an enabling input to AND 159. Phase 2 on line 107 is also connected to AND-gates 155, 157, 161.

Phase 4, line 109, is connected as an input to AND 144, the other input to which is $I_3$ on line 128. The output of AND 144 is one input to OR 146, the other input to which is $E_3$ on line 120. The output of OR 144 is an enabling input to AND 187. Phase 3 on line 109 is also connected to AND-gates 181, 183, 185. The outputs of AND gates 111, 133, 155 and 181 serve to gate the operand from its Array 0 to the execution unit.

Outputs from the corresponding similar groups of AND gates serve to gate the operands from the associated arrays to the execution unit as shown.

Request 0, line 102 is connected as an enabling input to AND-gates 111, 133, 158, 181. Request 1, Request 2 and Request 3 are likewise connected to their respective AND gates as shown.

The inverse of the condition of line 102, the output of inverter 119, is connected as an enabling input to AND-gates 113, 115, 117. The inverse of the condition of line 104, the output of inverter 121, is connected as an enabling input to AND-gates 115 and 117. The inverse of the condition of request line 106, the output of the inverter 123, is an enabling signal to AND-gate 117.

Likewise, the same pattern of inversions of the request line are used for the gates associated with phase 1 of counter 101, with the exception that the inverters are moved one stage downward. For example, the inverse of Request 1, line 104, the output of inverter 141, becomes an enabling signal to AND-gates 137, 139, and 133. The inverse of the condition of Request 2, line 106, the output of inverter 153, is an enabling input to AND-gates 139 and 133. The inverse of the condition of Request 3, line 108, the output of inverter 145, becomes an enabling input to AND-gate 133.

Likewise, for the circuitry associated with phase 2 on line 107, the inverse of the condition of Request 2 line 106, the output of inverter 169, is an enabling input for AND-gates 161, 155, and 157. The inverse of condition of Request 3 line 108, the output of inverter 171, is an enabling input to AND-gates 155 and 157. The inverse of Request 0 line 102, the output of inverter 167, is an enabling input to AND-gate 157.

This cyclic pattern repeats also for the AND gates associated with phase 3 of the ring counter 101 over line 109. The inverse of the condition of Request 3 line 108, the output inverter 193, is an enabling input to AND-gates 181, 183, and 185. The inverse of the condition of Request 0 line 102, the output of inverter 189, is an enabling input for AND-gates 183 and 185. Likewise, the inverse of the condition of Request 1 line 104, the output of the inverter 191, is an enabling input to AND-gate 185.

Line 100 over which machine timing pulses are transmitted at the assumed 8 nanosecond repetition rate is connected, via suitable delay D, as an enabling input to each operand-gating AND gate to synchronize the gating of operands at a maximum repetition rate of 1 each 8 nanoseconds. The delay D is chosen to simulate the delay the pulses will experience in passing through both the scaled priority counter 101, and also the counter and gating circuitry for each array as typically seen in FIG. 3, so that the activation of the various request lines 102, 104, 106, 108 coincides with and straddles in time the arrival of each machine timing pulse at the various operand-gating AND gates in FIG. 2.

The outputs of the AND gates associated with a particular request line from a particular array in FIG. 2 form a gating signal for gating the operand from the selected virtual processor requesting service. For example, the outputs 125, 147, 173, and 195 all gate operand 0. Likewise for gates with the other operands.

Operation of Priority Controller

The operation of the priority apparatus can be readily understood with reference to FIG. 2, 2A, 2B, 2C, and 3. Normal Operation will be explained first, and Extended Priority Operation will thereafter be explained.

Normal Operation

Normal Operation is indicated by the setting of all E positions of Extend register 110 to the zero state. Thus, according to logic equations 1–4, all the I positions of Inhibit register 112 are set to the one state during Normal Operations.

During Normal Operation $I_0$, on line 114, will be an active input to AND 130, the other input to which is Phase O. Therefore, during Normal Operation Phase 0 is connected via AND 130 and OR 132 to AND 111, as well as being directly connected to AND-gates 113, 115 and 117. Likewise, due to the activation of $I_1$ on line 116, Phase 1 is connected via AND 134 and OR 136 to AND 135, as well as being directly connected to AND-gates 133, 137, and 139 during Normal Operation. Similarly, due to $I_2$ and $I_3$ being active, Phases 2 and 3 are connected to each AND in the groups 155, 157, 159, 161 and 181, 183, 185, 187, respectively.

It will be recalled from FIG. 3 that the ring counter of each array cycles at a sampling rate of 8 nanoseconds, completing a sampling "revolution" of the array each 64 nanoseconds. For ease of illustration it can be assumed, without imposing limitation, that each array cycle begins its sampling with the first virtual processor in the array; namely, $P_0$ for array 0, $P_1$ for array 1, $P_2$ for array 2, and $P_3$ for array 3. Concurrently, scaled priority counter 101 of FIG. 2, synchronized with the array counters, begins its first phase as each array counter synchronously begins its first "revolution" of its respective array; and therefore counter 101 changes phase once each "revolution" of the array counters. This is seen graphically in FIG. 2A.

Figures 2A, 2B:
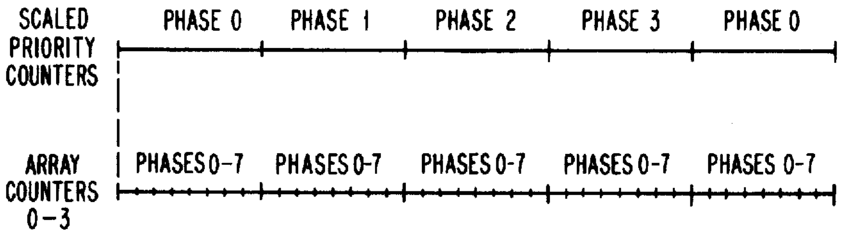
FIG. 2A is a diagram showing the relationship between the phases of Array 0–3 ring counters, and the phases of the scaled priority counter in the priority controller.
FIG. 2B is a table showing the manner in which priority is rotated among the arrays of processors under normal operation.

Designation, during each 8 nanosecond array time slot, of one of the arrays which has an outstanding service request to be that array having priority to request service from the execution unit proceeds as indicated systematically and exhaustively in the table of FIG. 2B which shows array priority under Normal Operation. The first column in that table shows the sequential phases of the scaled priority counter 101. The second column shows the phases of the individual array counters. The "$x$" in the individual sections of the second column indicate that the phases of the array counters are don't care functions. That is, regardless of the phase of the counters, actual array priority will be designated not as a function of the array counter phase but as a function of the particular arrays having outstanding service requests. The condition of the service requests in the individual arrays are shown in the columns headed Array Request Status, each corresponding to a particular array. The final two columns of the table indicate the array having nominal priority during a given priority counter phase and the array having actual priority, respectively.

An example can be seen with reference to the first four rows of the table. In those four rows the priority counter phase is 0, indicating nominal priority is in Array 0. That is, if, during each 8 nanosecond array time slot of the 64 nanosecond phase 0 of the priority counter, array 0 has a request outstanding, then regardless of the requests in arrays 1, 2 and 3, array 0 has actual priority. This is seen in the first row of the table. The $x$'s in columns 1, 2, and 3, and the 1 in column 0 indicates that as long as there is a request outstanding in array 0, the request status of arrays 1, 2, and 3 are don't care functions since nominal array priority is with array 0, which has a request outstanding according to the table. Therefore, actual array priority rests with array 0. Turning to the second row, we see that although array 0 has nominal priority, the 0 under the array 0 Request Status column indicates that array 0 has no outstanding request. The 1 under the array 1 column indicates that there is an outstanding request in array 1. Since there is no request in array 0, which has nominal priority, and there is a request in array 1, actual priority is moved downward one position so that actual array priority rests with array 1. Since array 1 has a service request as postulated by the table, the request status of arrays 2 and 3 are don't care functions. As can be seen in the third row of the table, if, during phase 0 of priority counter 101, neither array 0 nor 1 has an outstanding request, but array 1 has an outstanding request, then nominal priority is passed down two arrays and actual array priority rests with array 2, regardless of condition of array 3. Finally, row 4 shows that if, during array 0 of priority counter 101, none of arrays 0, 1, or 2 has a service request outstanding, but array 3 has a service request outstanding, then, although nominal array priority is with array 0, nevertheless, actual array priority is passed downwardly three arrays to array 3.

The same situation is maintained for priority counter 101 phase 1, with the exception that, in the fifth line of the table, we start with a service request outstanding in array 1. If that condition occurs, then regardless of the status of requests in the other arrays, actual as well as nominal priority rests with array 1. Rows 6, 7, 8 show how priority is passed downward with row 8 showing that priority is cyclic. That is, if during phase 1 of priority counter 101, neither array 1 (the nominal priority array) nor arrays 2 or 3 (the next two highest priority arrays, respectively) have a service request, then priority is passed in an end-around fashion to array 0. The rest of the table indicates that action is maintained similarly for each phase of priority counter 101 and begins again with phase 0, Row 17, as the priority counter begins its second group of phases, and proceeds thusly continuously.

An example of the action of Normal Operation indicated in FIG. 2B can be seen with respect to FIG. 2. For example, during phase 0 of scaled priority counter 101, Phase 0 line 103 will be activated for 64 nanoseconds. Also, each operand-gating AND gate in the gating configuration will have pulses applied to it at assumed 8 nanosecond repetition rate over line 100. The delay block D, in line 100, indicates that enough delay should be added to the line to simulate the time that it takes for the pulses to pass through scaled priority counter 101 and through the array counter in a given array such that the machine timing pulses will arrive at the operand-gating AND gates in proper timing sequence to gate the appropriate operands as a function of the condition of request lines 102, 104, 106, 108 and the appropriate priority counter phase. With concurrent reference to FIG. 2 and to Row 0 of the table of FIG. 2B, if during any phase of the array counters a request is outstanding on line 102 of array 0 during priority counter phase 0, then the operands and request from phase 0 will be gated. This can be seen by noting that all I positions of Inhibit Register 110 are one for Normal Operation. Thus, priority counter phase 0 is an active input to AND 111 and, therefore, all inputs to AND-gate 111 will thereby be fulfilled. Also, there will be a blocking input to AND-gates 113, 115, and 117 as a result of the absence of an output from inverter 119, to insure that only the Array 0 operands are gated.

Moving on to Row 2 of the table of FIG. 2B, it can be seen that if there is a request from array 1, and no request from array 0 during any array counter phase within priority counter phase 0, then, from FIG. 2, all the inputs to AND-gate 113 will be satisfied. Thus, although nominal priority rests with array 0, actual priority will be with array 1, and array 1 operands will be gated by line 127 to the execution unit. No other array operands will be gated since there will be blocking inputs to the other operand-gating AND gates associated with phase 0 of the priority counter 101 because line 102 will be inactive for AND-gate 111, and the absence of an output from inverter 121 will effectively block AND-gates 115 and 117.

Row 3 of the table can be explained by noting that if there are no requests from array 0 or array 1 and a request occurs from array 2 during any array counter phase within priority counter phase 0, then AND-gate 115 will have all of its inputs fulfilled to gate the operands from array 2 with line 129. Therefore, although nominal priority is with array 0, actual array priority rests with array 2. None of the other arrays will be gated since the absence of an output from inverter 123 blocks AND-gate 117 and the lack of signals on lines 102 and 104 effectively blocks AND-gates 111 and 113, respectively.

Finally, Row 4 of the table of FIG. 2B can be explained with reference to FIG. 2 by noting that under that situation lines 102, 104, and 106 are inactive thus blocking AND-gates 111 through 115, while line 108 and all other inputs to AND-gate 117 are active during any array counter phase within priority counter phase 0 to gate the operands of array 3 with line 131, thus indicating that actual array priority has been passed downwardly 3 arrays from nominal priority array 0 to array 3. Likewise, the other portions of the table can be seen by working through the logic of FIG. 2 for the other three phases of priority counter 101 as was done for phase 0.

Attention is now invited to FIG. 4. In that figure are seen the gating lines for each of the operand groups of each array. For example, those associated with gating operands from Array 0 the operand lines 125, 147, 173, and 195. It will be recognized that these are the gating lines associated with the gating of operand 0 in the priority controller described in FIG. 2. These lines are enabling inputs to OR-gate 255, the output of which forms a gating input over line 199 to gate 271 which effectively gates the operands from the selected processor in array 0 to operand bus 279 to be transmitted to the execution unit in an attempt to gain the service of an execution facility. Line 199 also serves as a request line to the execution unit. Likewise, the gating lines from FIG. 2 for gating operand 1 form enabling inputs to OR-gate 257, the output of which over line gate 299 forms a gating input for gate 273 to gate the operands of array 1 to the operand bus 279 and from thence to the execution unit. Line 299 also serves as a request line to the execution unit. Likewise, the lines for gating operands from Array 2, seen as output lines in FIG. 2, form enabling inputs to OR 259 the output of which, line 399, forms a gating signal to gate 275 to gate array 2 operands from bus 267 on to operand bus 279 and from thence to the execution unit. Line 399 also forms a request to the execution unit via bus 13. The lines for gating operands from Array 3 are handled similarly.

An example of priority controller Normal Operation will now be given on the assumption that the arrays shown in table I, abbreviated as A0, A1, A2, A3 have requests $R_0$, $R_1$, $R_2$, $R_3$ from the indicated virtual processors during the phases as shown. The particular processors having a request outstanding are determined by their particular programs which may be dictated by control 32 not discussed here. Since this is Normal Operation Mode, all E positions in Register 110 are at the zero state and all I positions in Register 112 are at the one state. Outstanding requests on lines 102, 104, 106, and 108 are determined during each array counter phase as mentioned above with respect to the operation of FIG. 3. Assignment of nominal and actual priority is made as was explained with reference to FIG. 2, 2A, and 2B, above.

For example, and referring back to FIG. 2 and 2B, if during the first phase 0 of priority counter 101, the requesting virtual processors are as shown in the arrays as noted in table I, then during array counter phase 0, $P_0$ which has nominal priority by virtue of activation of line 103 of FIG. 2 will have actual priority since all conditions of AND 111 are fulfilled. Therefore, line 125 gates the operands from array 0, which in this case are the operands of $P_0$, as seen in FIG. 4. During array counter phase 1 within priority counter phase 0, seen in the second row of table I, it is seen that each array has stepped one count and sampled its processor. The sampled processors in arrays 0, 2 and 3, namely $P_4$, $P_6$, and $P_7$, respectively, have requests outstanding. With respect to FIG. 2 it can be seen that concurrently with this step of the array counter, the machine pulse which stepped the array counter in each array has passed through the delay block D in line 100 and has arrived at each AND-gate in time synchronization with the requests from $P_4$, $P_6$, and $P_7$ over lines 102, 106, and 108, respectively. However, since line 103 alone of the phase lines of priority counter 101 is active to condition AND 111 via OR 132, and since array 0 has nominal priority by virtue of the complement of condition of the Request 0 line 102 from inverter 119 is effectively blocking AND-gates 113, 115, and 117 (FIG. 2), only $P_4$ of array 0 is allowed to have its operands gated to the execution unit. Hence, array 0 has both nominal and actual priority during this phase of the array counters and the operands of the $P_4$ are gated to the execution unit. Array counter phase 2 within priority counter phase 0 is seen in row three of table I and is similar to that of array counter phase 0 in that the requesting virtual processor of array 0, $P_8$ in this situation, has both nominal and actual priority. In the fourth row of the table we see a situation in which array 0 does not have a requesting virtual processor during the phase in which it has nominal priority, but both array 1 and array 2 do have virtual processors requesting access, namely, $P_{13}$ and $P_{14}$. This situation corresponds to the second row in the table of FIG. 2B and is an example of how priority is passed downwardly when the array having nominal priority does not have a virtual processor with an outstanding service request during a given array counter phase. In this situation for example, virtual processor $P_{13}$ will cause Request 1 line 104 of FIG. 2 to be activated during phase 3 of the array counter associated with array 1. The same machine timing pulse which caused the array counter in array 1 to sample virtual processor $P_{13}$ will pass also through delay D and down line 100 to arrive at AND-gate 113 concurrently

TABLE 1

Normal Operation

| Row | Priority counter phase | Array counter phase | Virtual processors requesting (A0), $R_0$ | (A1), $R_1$ | (A2), $R_2$ | (A3), $R_3$ | Nominal priority | Actual priority |
|---|---|---|---|---|---|---|---|---|
| 1 | 0 | 0 | $P_0$ | $P_1$ | --- | --- | A0, $P_0$ | A0, $P_0$ |
| 2 | 0 | 1 | $P_4$ | --- | $P_6$ | $P_7$ | A0, $P_4$ | A0, $P_4$ |
| 3 | 0 | 2 | $P_8$ | $P_9$ | --- | --- | A0, $P_8$ | A0, $P_8$ |
| 4 | 0 | 3 | --- | $P_{13}$ | $P_{14}$ | --- | A0, $P_{12}$ | A1, $P_{13}$ |
| 5 | 0 | 4 | --- | $P_{17}$ | $P_{18}$ | $P_{19}$ | A0, $P_{16}$ | A1, $P_{17}$ |
| 6 | 0 | 5 | --- | --- | --- | $P_{23}$ | A0, $P_{20}$ | A3, $P_{23}$ |
| 7 | 0 | 6 | --- | --- | $P_{26}$ | --- | A0, $P_{24}$ | A2, $P_{26}$ |
| 8 | 0 | 7 | $P_{28}$ | $P_{29}$ | $P_{30}$ | $P_{31}$ | A0, $P_{28}$ | A0, $P_{28}$ |
| 9 | 1 | 0 | $P_0$ | $P_1$ | $P_2$ | --- | A1, $P_1$ | A1, $P_1$ |
| 10 | 1 | 1 | $P_4$ | --- | $P_6$ | $P_7$ | A1, $P_5$ | A2, $P_6$ |
| 11 | 1 | 2 | --- | $P_9$ | --- | --- | A1, $P_9$ | A1, $P_9$ |
| 12 | 1 | 3 | $P_{12}$ | $P_{13}$ | --- | --- | A1, $P_{13}$ | A1, $P_{13}$ |
| 13 | 1 | 4 | $P_{16}$ | $P_{17}$ | $P_{18}$ | --- | A1, $P_{17}$ | A1, $P_{17}$ |
| 14 | 1 | 5 | --- | --- | --- | $P_{23}$ | A1, $P_{21}$ | A3, $P_{23}$ |
| 15 | 1 | 6 | $P_{24}$ | --- | --- | $P_{27}$ | A1, $P_{25}$ | A3, $P_{27}$ |
| 16 | 1 | 7 | $P_{28}$ | --- | --- | --- | A1, $P_{29}$ | A0, $P_{28}$ |
| 17 | 2 | 0 | $P_0$ | $P_1$ | $P_2$ | $P_3$ | A2, $P_2$ | A2, $P_2$ |
| 18 | 2 | 1 | $P_4$ | --- | --- | $P_7$ | A2, $P_6$ | A3, $P_7$ |
| 19 | 2 | 2 | $P_8$ | --- | --- | $P_{11}$ | A2, $P_{10}$ | A3, $P_{11}$ |
| 20 | 2 | 3 | --- | $P_{13}$ | --- | $P_{15}$ | A2, $P_{14}$ | A3, $P_{15}$ |
| 21 | 2 | 4 | $P_{16}$ | --- | $P_{18}$ | $P_{19}$ | A2, $P_{18}$ | A2, $P_{18}$ |
| 22 | 2 | 5 | --- | $P_{21}$ | $P_{22}$ | --- | A2, $P_{22}$ | A2, $P_{22}$ |
| 23 | 2 | 6 | $P_{24}$ | --- | $P_{26}$ | --- | A2, $P_{26}$ | A2, $P_{26}$ |
| 24 | 2 | 7 | $P_{28}$ | --- | $P_{30}$ | --- | A2, $P_{30}$ | A2, $P_{30}$ |
| 25 | 3 | 0 | $P_0$ | --- | $P_2$ | --- | A3, $P_3$ | A0, $P_0$ |
| 26 | 3 | 1 | $P_4$ | --- | $P_6$ | --- | A3, $P_7$ | A0, $P_4$ |
| 27 | 3 | 2 | $P_8$ | --- | $P_{10}$ | --- | A3, $P_{11}$ | A0, $P_8$ |
| 28 | 3 | 3 | $P_{12}$ | --- | $P_{14}$ | --- | A3, $P_{15}$ | A0, $P_{12}$ |
| 29 | 3 | 4 | $P_{16}$ | $P_{17}$ | --- | $P_{19}$ | A3, $P_{19}$ | A3, $P_{19}$ |
| 30 | 3 | 5 | --- | $P_{21}$ | --- | $P_{23}$ | A3, $P_{23}$ | A3, $P_{23}$ |
| 31 | 3 | 6 | --- | $P_{25}$ | --- | --- | A3, $P_{27}$ | A1, $P_{25}$ |
| 32 | 3 | 7 | --- | $P_{29}$ | --- | --- | A3, $P_{31}$ | A1, $P_{29}$ |
| 33 | 0 | 0 | $P_0$ | $P_1$ | $P_2$ | $P_3$ | A0, $P_0$ | A0, $P_0$ |
| . | . | . | . | . | . | . | . | . |
| . | . | . | . | . | . | . | . | . |
| . | . | . | . | . | . | . | . | . |

with the activation of line 104. Like wise, line 103 will act as an enabling input to AND-gate 113. Finally, the complement of the condition of line 102, the output of inverter 119, will be in its active state thus completing the enabling inputs to 113 and allowing the operand from array 1, namely the operands of virtual processor $P_{13}$, to be gated to the execution unit to attempt to be serviced. Since the complement of line 104, the output of inverter 121, is an input to AND-gates 115 and 117, these AND gates will be disabled inasmuch as line 104 is active. Thus, although $P_8$ of array 0 has nominal priority in the situation indicated in line 4 of the table, nevertheless $P_{13}$ of array 1 has actual priority and its operands are gated to the execution unit. A lower priority request, such as $P_{14}$, is a don't care function. A similar situation exists in Row 5 for phase 4 of the array counters where $P_{17}$ of array 1 will have actual priority although Array 0 has nominal priority. In array counter phase 5 of priority counter phase 0 (Row 6), it is noted that only the virtual processor being sampled from array 3, namely $P_{23}$, has a service request outstanding. This situation corresponds to row 4 of the table in FIG. 2B, and thus priority is passed down from array 0 to array 3. This is seen with respect to FIG. 2 as follows. During array counter phase 5, each array counter is sampling its respective processor for phase 5, namely $P_{20}$, $P_{21}$, $P_{22}$, and $P_{23}$. Only $P_{23}$ has a service request outstanding, and therefore only line 108 of all the request lines in FIG. 3 will be activated. The pulse on line 100, after passing through delay D, will arrive at AND-gate 117 concurrently with the activation of line 108. Also, line 103 is activated (since we are in priority counter phase 0) to form a third enabling input to AND-gate 117. Finally, since lines 102, 104, and 106 are inactive, the complement of their values, namely the outputs of inverters 119, 121, and 123, respectively, serve as enabling inputs to AND 117 which are also fulfilled at this time. Therefore, line 131 serves to gate the operands of array 3, namely the operands of virtual processor $P_{23}$, to the execution unit. Priority operates similarly for all phases of the priority counter 101 and further illustrations can be seen by working through table I in the manner described above.

It will be appreciated that the entries in table I are merely for the purpose of illustrating array priority under normal operation. That is, it shows which array is a candidate for request acceptance at a given time. It is not guaranteed that the operands gated to the execution unit will indeed be accepted for service. The mechanics of how a request is accepted or rejected during a given presentation to the execution unit will be explained subsequently with respect to FIGS. 5 and 6. However, table I assumes each request is accepted when gated to the execution unit, merely for ease of illustration of the priority controller, though if a gated request were rejected the structure of table I would be affected. For example, if the operands gated at Row 3 (AO, $P_8$)were not accepted, then that same request (A0, $P_8$) would remain when Processor $P_8$ is sampled during the corresponding array counter phase within the next priority counter phase (e.g., Row 11 of table I in the present example). However, the construction of an illustration which takes into account the accept/reject possibilities is not required if table I is restricted to use as a vehicle for illustrating array priority only.

Extended Priority Operation

In extended priority operation a desired array is given actual priority whenever it has a service request, regardless of the priority counter phase. This is distinguished from normal operation where priority is rotated beginning with the priority counter phase. Extended priority operation is initiated by setting to a one state the E position in the Extend Register corresponding to the desired array to be designated as having extended priority.

As seen in FIG. 2C, when each E position is set to the zero state, each I position of the Inhibit Register 112 is set to the one state. This can be seen from logic equations 1–4 discussed previously and also reproduced at FIG. 2C. Therefore, with lines 122, 124, 126, 128 active, each priority counter phase on lines 103, 105, 107, 109 is respectively connected as an input to each of its associated operand-gating AND gates. For example, line 103 is effectively connected to AND 111, as well as to ANDs 113, 115, 117. The other priority counter phase lines are similarly disposed. As can be seen in the table of FIG. 2C, to initiate extended priority operation one E position, for example $E_1$, is set to the one state while the others remain at the zero state. Thus, Array 1 is designated as having extended priority. With reference to FIG. 2, it can be seen that $E_1$ from line 124 excites OR 136 constantly to enable AND 135 to gage the operands from the designated array, Array 1, whenever a request $R_1$ from that array is available on line 104. As can be seen from the logic equations which indicate the hardware of Inhibit Logic 160, if there is no outstanding request from the designated array, then normal operation exists. For example, if $E_1$ is set to the one state, operands from Array 1 are gated by line 149 whenever $R_1$ is active, during synchronized periods when line 100*d* is active. However, if $E_1$ is one and $R_1$ is zero, then normal operation transfers nominal priority according to the current priority counter phase. Thus, if the priority counter is in Phase 0, and $E_1$ is 1 and there is no $R_1$, the term $(E_1 \cdot R_{1ah})$ *in the logic equation for* $I_0$ sets the $I_0$ position to one so that line 122 allows Priority Counter Phase 0 to activate AND 111 as in normal operation. Array 0 then has nominal priority, which is rotated downwardly in normal operation if there is no request in Array 0. Action continues thusly for all phases of the priority counter. However, as soon as there is a request ready during any array counter phase of Array 1, action reverts back to extended priority operation and Array 1 has actual priority. This can be seen by continuing the example for the logic equation for $I_0$ with $E_1$ set to one. When $R_1$ is zero, $I_0$ is one and Array 0 100*d* nominal priority and action is normal operation. However, if during one of the array counter phases within Priority Counter Phase 0, Array 1 initiates a request ($R_1$=1), then the term $E_1 \cdot R_1$ in the $I_0$ equation is zero, as are all other terms and $I_0$ becomes zero. In FIG. 2, this disconnects Priority Counter Phase 0, line 103, from AND 111 by disabling AND 130. Since $E_1$ is one, line 116 concurrently conditions AND 135 to gate operands from Array 1 with line 149, since $R_1$ is 1 and the synchronization line 100*d* is active. Hence, action has reverted back to extended priority operation. Operation switches back and forth between normal and extended priority depending on the setting of the Extend Register and the availability of a request in the designated array.

Therefore, it can be seen that the function of the Extend Register 110 is to directly enable the highest priority operand-gating AND gate for a given array in order to designate that array as having highest priority if it has a request available. Concurrently, all positions of the Inhibit Register 112 will be at the zero state and therefore will disable the counter phase counter phase from the highest priority operand-gating AND gates. This is seen by lines 122, 124, 126, and 128 being an input to AND-gates 130, 134, 138, 144. Further, as can be seen from logic equations 1–4, if the array designated as having highest priority does not have a request available during a given array counter phase, then the priority controller will immediately revert to normal operation, inasmuch as the position of the Inhibit Register which corresponds to the current priority phase will then be set to the one state to connect that priority counter phase directly to the highest priority operand-gating AND gate, while that priority counter phase is also connected to its lower priority operand-gating AND gates so that operation during that array counter phase is rotated according to normal operation.

An example of priority controller extended priority operation will now be given on the assumption that the arrays shown in table II, abbreviated as A0, A1, A2, A3, have requests R0, R1, R2, R3 from the indicated virtual processors during the phases as shown, which are the same as these used in table I for table normal operation. The particular processors having a request outstanding are determined by their particular programs, which may be dictated by control 32 of FIG. 1, not discussed here. Since this is an illustration of extended priority mode operation, the settings of the E positions of the Extend Register 110, as well as the settings of the I positions of the Inhibit Register 112, dictated by logic equations 1–4, are listed in columns. Outstanding requests on Request Lines 102, 104, 106, and 108 are determined during each priority counter phase as mentioned above with respect to FIG. 3. Assignment of nominal and actual priority is shown as listed. The final column of the table indicates how operation switches back and forth between normal operation and extended priority operation, depending upon

TABLE II

| Row | Priority counter phase | Array counter phase | Virtual processors requesting (A0), $R_0$ | (A1), $R_1$ | (A2), $R_2$ | (A3), $R_3$ | $E_0$ | $E_1$ | $E_2$ | $E_3$ | $I_0$ | $I_1$ | $I_2$ | $I_3$ | Nominal priority | Actual priority | Operation |
|---|---|---|---|---|---|---|---|---|---|---|---|---|---|---|---|---|---|
| 1 | 0 | 0 | $P_0$ | $P_1$ | | | 0 | 0 | 0 | 0 | 1 | 1 | 1 | 1 | A0, $P_0$ | A0, $P_0$ | N.O. |
| 2 | 0 | 1 | $P_4$ | | $P_6$ | $P_7$ | 0 | 0 | 0 | 0 | 1 | 1 | 1 | 1 | A0, $P_4$ | A0, $P_4$ | N.O. |
| 3 | 0 | 2 | $P_8$ | $P_9$ | | | 0 | 0 | 0 | 0 | 1 | 1 | 1 | 1 | A0, $P_8$ | A0, $P_8$ | N.O. |
| 4 | 0 | 3 | | $P_{13}$ | $P_{14}$ | | 0 | 0 | 0 | 0 | 1 | 1 | 1 | 1 | A0, $P_{12}$ | A1, $P_{13}$ | N.O. |
| 5 | 0 | 4 | | $P_{17}$ | $P_{18}$ | $P_{19}$ | 0 | 0 | 1 | 0 | 0 | 0 | 0 | 0 | A0, $P_{16}$ | A2, $P_{18}$ | E.P.O. |
| 6 | 0 | 5 | | | | $P_{23}$ | 0 | 0 | 1 | 0 | 1 | 0 | 0 | 0 | A0, $P_{20}$ | A3, $P_{23}$ | N.O. |
| 7 | 0 | 6 | | | $P_{26}$ | | 0 | 0 | 1 | 0 | 0 | 0 | 0 | 0 | A0, $P_{24}$ | A2, $P_{26}$ | E.P.O. |
| 8 | 0 | 7 | $P_{28}$ | $P_{29}$ | $P_{30}$ | $P_{31}$ | 0 | 0 | 1 | 0 | 0 | 0 | 0 | 0 | A0, $P_{28}$ | A0, $P_{30}$ | E.P.O. |
| 9 | 1 | 0 | $P_0$ | $P_1$ | $P_2$ | | 1 | 0 | 0 | 0 | 0 | 0 | 0 | 0 | A1, $P_1$ | A0, $P_0$ | E.P.O. |
| 10 | 1 | 1 | $P_4$ | | $P_6$ | $P_7$ | 1 | 0 | 0 | 0 | 0 | 0 | 0 | 0 | A1, $P_5$ | A0, $P_4$ | E.P.O. |
| 11 | 1 | 2 | | $P_9$ | | | 1 | 0 | 0 | 0 | 0 | 1 | 0 | 0 | A1, $P_9$ | A1, $P_9$ | N.O. |
| 12 | 1 | 3 | $P_{12}$ | $P_{13}$ | | | 1 | 0 | 0 | 0 | 0 | 0 | 0 | 0 | A1, $P_{13}$ | A0, $P_{12}$ | E.P.O. |
| 13 | 1 | 4 | $P_{16}$ | $P_{17}$ | $P_{18}$ | | 1 | 0 | 0 | 0 | 0 | 0 | 0 | 0 | A1, $P_{17}$ | A0, $P_{16}$ | E.P.O. |
| 14 | 1 | 5 | | | | $P_{23}$ | 1 | 0 | 0 | 0 | 0 | 1 | 0 | 0 | A1, $P_{21}$ | A3, $P_{23}$ | N.O. |
| 15 | 1 | 6 | $P_{24}$ | | | $P_{27}$ | 1 | 0 | 0 | 0 | 0 | 0 | 0 | 0 | A1, $P_{25}$ | A0, $P_{24}$ | E.P.O. |
| 16 | 1 | 7 | $P_{28}$ | | | | 1 | 0 | 0 | 0 | 0 | 0 | 0 | 0 | A1, $P_{29}$ | A0, $P_{28}$ | E.P.O. |
| 17 | 2 | 0 | $P_0$ | $P_1$ | $P_2$ | $P_3$ | 1 | 0 | 0 | 0 | 0 | 0 | 0 | 0 | A2, $P_2$ | A0, $P_0$ | E.P.O. |
| 18 | 2 | 1 | $P_4$ | | | $P_7$ | 1 | 0 | 0 | 0 | 0 | 0 | 0 | 0 | A2, $P_6$ | A0, $P_4$ | E.P.O. |
| 19 | 2 | 2 | $P_8$ | | | $P_{11}$ | 1 | 0 | 0 | 0 | 0 | 0 | 0 | 0 | A2, $P_{10}$ | A0, $P_8$ | E.P.O. |
| 20 | 2 | 3 | | $P_{13}$ | | $P_{15}$ | 1 | 0 | 0 | 0 | 0 | 0 | 1 | 0 | A2, $P_{14}$ | A3, $P_{15}$ | N.O. |
| 21 | 2 | 4 | $P_{16}$ | | $P_{11}$ | $P_{19}$ | 1 | 0 | 0 | 0 | 0 | 0 | 0 | 0 | A2, $P_{18}$ | A0, $P_{16}$ | E.P.O. |
| 22 | 2 | 5 | | $P_{21}$ | $P_{22}$ | | 1 | 0 | 0 | 0 | 0 | 0 | 1 | 0 | A2, $P_{22}$ | A0, $P_{24}$ | N.O. |
| 23 | 2 | 6 | $P_{24}$ | | $P_{26}$ | | 1 | 0 | 0 | 0 | 0 | 0 | 0 | 0 | A2, $P_{26}$ | A2, $P_{28}$ | E.P.O. |
| 24 | 2 | 7 | $P_{28}$ | | $P_{30}$ | | 1 | 0 | 0 | 0 | 0 | 0 | 0 | 0 | A2, $P_{30}$ | A0, $P_{28}$ | E.P.O. |
| 25 | 3 | 0 | $P_0$ | | $P_2$ | | 0 | 0 | 1 | 0 | 0 | 0 | 0 | 0 | A3, $P_3$ | A2, $P_2$ | E.P.O. |
| 26 | 3 | 1 | $P_4$ | | $P_6$ | | 0 | 0 | 1 | 0 | 0 | 0 | 0 | 0 | A3, $P_7$ | A2, $P_6$ | E.P.O. |
| 27 | 3 | 2 | $P_8$ | | $P_{10}$ | | 0 | 0 | 1 | 0 | 0 | 0 | 0 | 0 | A3, $P_{11}$ | A2, $P_{10}$ | E.P.O. |
| 28 | 3 | 3 | $P_{12}$ | | $P_{14}$ | | 0 | 0 | 1 | 0 | 0 | 0 | 0 | 0 | A3, $P_{15}$ | A2, $P_{14}$ | E.P.O. |
| 29 | 3 | 4 | $P_{16}$ | $P_{17}$ | | $P_{19}$ | 0 | 0 | 1 | 0 | 0 | 0 | 0 | 1 | A3, $P_{19}$ | A3, $P_{19}$ | N.O. |
| 30 | 3 | 5 | | $P_{21}$ | | $P_{23}$ | 0 | 0 | 1 | 0 | 0 | 0 | 0 | 1 | A3, $P_{23}$ | A3, $P_{23}$ | N.O. |
| 31 | 3 | 6 | | $P_{25}$ | | | 0 | 0 | 1 | 0 | 0 | 0 | 0 | 1 | A3, $P_{27}$ | A1, $P_{25}$ | N.O. |
| 32 | 3 | 7 | | $P_{29}$ | | | 0 | 0 | 1 | 0 | 0 | 0 | 0 | 1 | A3, $P_{31}$ | A1, $P_{29}$ | N.O. |
| 33 | 0 | 0 | $P_0$ | $P_1$ | $P_2$ | $P_3$ | 0 | 0 | 1 | 0 | 0 | 0 | 0 | 0 | A0, $P_0$ | A2, $P_2$ | E.P.O. |
| . | . | . | . | . | . | . | . | . | . | . | . | . | . | . | . | . | . |

the setting of the E Register and the availability, during a given priority counter phase, of a request in the array designated as having highest priority under extended priority operation. As was the case for table I, it is assumed that each gated operand is accepted for service by the execution unit, merely for the purpose of illustrating priority controller operation.

For example, and referring to FIG. 2 in conjunction with table II, the first four rows of the table indicate that the E settings out of the Extend Register are zeros so that all I positions are one. This being the case, all priority counter phase lines are essentially connected to each of their associated operand-gating AND gates. Therefore, operation is normal operation (N.O.) as shown in the first four rows of the table, and the arrays having actual priority are the same as those which had actual priority in the same situation for table I. In row 5 of table II, it is seen that $E_2$ is one so that Array 2 has been designated as the array having extended priority if it has a request available during a given array counter phase. As can be seen from Row 5, if operation were normal then nominal priority would be with the request from Array 0, namely, AO,$P_{16}$. That is, referring to FIG. 2, in normal operation all I positions would be in the one state. In particular, $I_0$ would be in the one state and line 122 would condition AND 130, the output of which would connect to AND 111 through OR 132. However, in the present situation $E_2$ being set to the one state indicates that Array 2 has priority. Since, according to row 5, Array 2 has a request outstanding ($P_{18}$), then, according to logic equations 1–4, all of the I positions of the Inhibit Register are zero, thus disconnecting the priority counter phase lines from the highest priority operand-gating AND gates. Likewise, line 118 from the $E_2$ position of the Extend Register 110 enables OR-gate 140 to designate Array 2 as having highest priority. The request on line 106, namely $P_{18}$, is thereby gated by line 177. This is summarized in the priority columns of the table. Although nominal priority under normal operation would have been A0,$P_{16}$, actual priority is A2,$P_{18}$, and operation is extended priority operation (E.P.O.).

In row 6 of table II, it is seen that the priority controller has progressed to array counter phase 5 of priority counter phase 0. It is noted that only the virtual processor being sampled in Array 3, namely, $P_{23}$ has a service request outstanding. $E_2$ is still at a one state, indicating that Array 2 has highest priority if it has a request ($R_2$) outstanding. However, there is no request outstanding in Array 2. Therefore, logic equation 1 indicates that $I_0$ is one. Therefore, line 122 essentially connects the priority counter phase 0 line to AND 111. Thus the priority controller reverts to normal operation. As seen from the table in row 6, nominal priority is A0,$P_{20}$. However, since Array 0 does not have an outstanding request, priority is passed downwardly three arrays to A3,$P_{23}$ as was done under normal operation in table I.

In rows 7 and 8, array counter phase 6 and 7 of priority counter phase 0, $E_2$ designates Array 2 as having highest priority. Since Array 2 has a request outstanding during each of those array counter phases, namely requests from $P_{26}$ and $P_{30}$, operation reverts to E.P.O. with actual priority being A2,$P_{26}$ and A0,$P_{30}$, respectively. During array counter phase 1, rows 9–16 of table II, it is seen that $E_0$ is a one state indicating that Array 0 is to have highest priority if it has a request outstanding. Since Array 0 has a request outstanding during array counter phases 0 and 1 of priority counter phase 1, extended priority operation continues and actual priority is with A0,$P_0$ and A0,$P_4$, respectively, in rows 9 and 10. In row 11 it is seen that although $E_0$ is one, Array 0 does not have an outstanding request so that, according to logic equation 2, $I_1$ is at a one state, inasmuch as the controller is within priority counter phase 1; and operation reverts to normal operation so that actual priority is with A1,$P_9$ as was the case with the corresponding row in table I. Thus it can be seen by working through table II as explained for the first ten rows, that operation switches back and forth from normal operation to extend priority operation, depending upon the settings of the Extend Register 110, the priority counter phase and availability of requests from arrays.

Structure of Execution Unit

Figure 6:
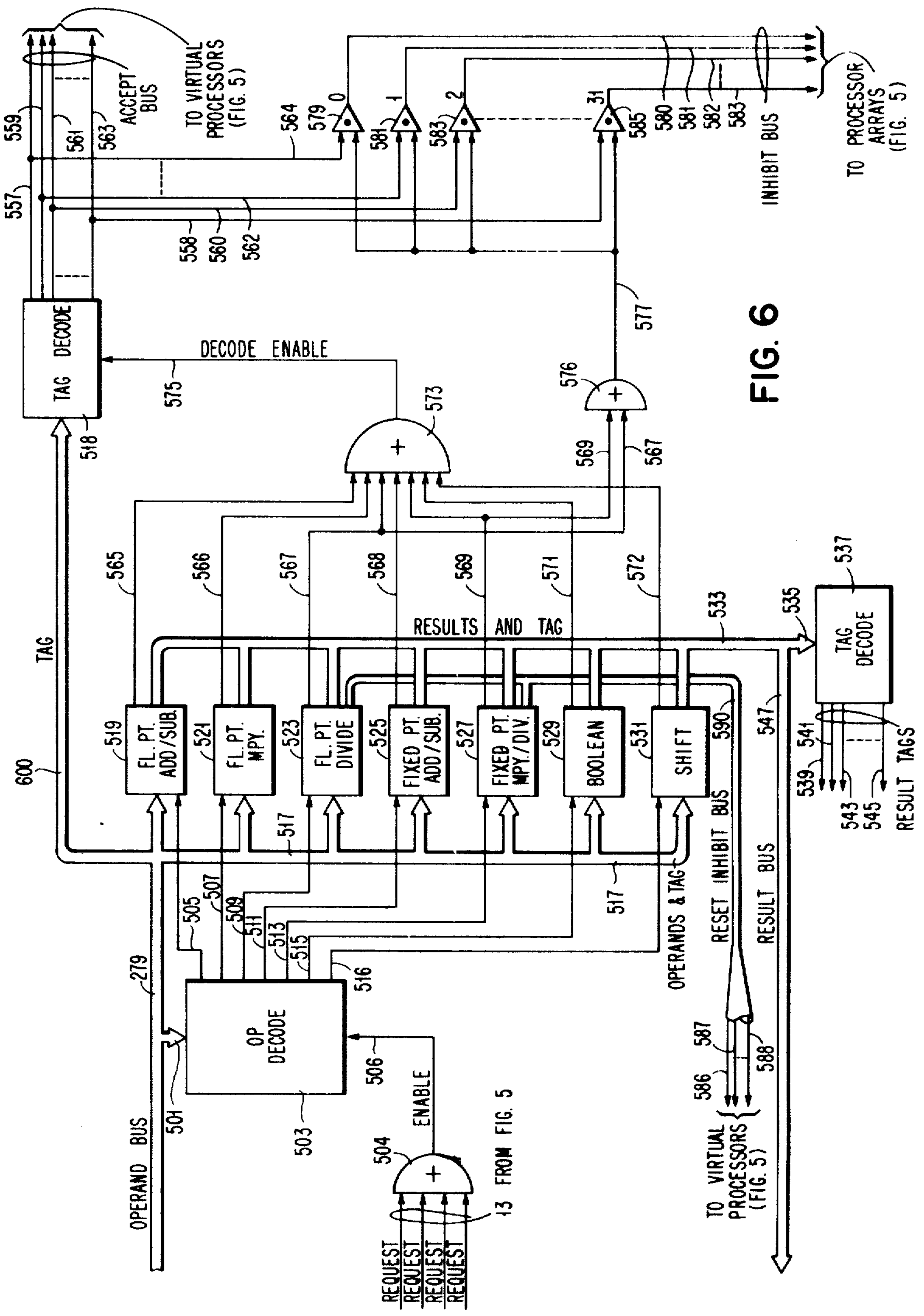
FIG. 6 is a block diagram of a pipelined execution unit having multiple execution facilities, and also showing transmission means for various control signals.

With reference to FIG. 6 there is seen a diagrammatic representation of the time shared pipelined execution unit. Although the execution unit need not be limited to the pipelined type, pipelining is one manner of greatly enhancing the speed of an execution unit. Inasmuch as the pipelined execution units are well known to those skilled in the art, and information is readily available on such units from prior publications, a detailed implementation of pipelining itself will not be given here, but only a broad diagram of the execution unit itself will be shown.

For further details on pipelining, the reader is referred to the paper "The IBM System/360 Model 91: Floating-Point Execution Unit" by S. F. Anderson, J. G. Earle, R. E. Goldschmidt and D. M. Powers; *IBM Journal of Research and Development*, Vol. 11, No. 1, Jan., 1967, pages 34–53. Particular attention is called to pages 36–7 and 45–8 of the paper cited next above.

The execution unit seen in FIG. 6 contains independent execution facilities 519, 521, 523,...,531. These facilities perform the functions of floating point addition and subtraction, floating point multiply, floating point divide, fixed point addition and subtraction, fixed point multiply and divide, Boolean functions, and shifting. It will be recognized by those skilled in the art that this designation of resources is tentative and may be changed by those skilled in the art without departing from the spirit or the scope of the invention. All operations except the divide operations are assumed for purposes of illustration to have a 64 nanosecond latency.

As was mentioned with regard to FIG. 5, the operand op code and tag field identifying the particular processor are transmitted over the operand bus 279. In FIG. 6, it is seen that operand bus 279 is connected via appropriate gating circuitry, not shown, to bus 501 such that the op code section of the operands is transmitted to op decode 503 for decoding. Op decode 503 is a binary to 1 out of N-type decoder. For example, to select an operation in one of the seven facilities shown, the op code can contain a minimum of three bits, with an individual binary combination of bits indicating an individual unit. The facility selected will be indicated by a signal over one of lines 505, 507,...,516. This line will act as a service request and also gate the operands and the processor identification tags to the particular execution facility. Concurrently, the tag is also gated over bus 518 to the tag decoder which decodes the binary address of the requesting processor in a 1 out of N-decoder 518. If the selected execution facility is not busy and can accept a new service request, it will respond over one of lines 565, 566,...,572. Each of these lines are connected as inputs to OR-gate 573. An input from any of these lines will activate line 575 to gate the output of the tag decode over the appropriate one of the lines 557, 559,...,561 of the accept bus to the arrival processors to act as an acceptance line. It will be noted with reference back to FIG. 5 that each processor has an acceptance flip-flop set by an accept line such as 557 for processor 0. The accept flip-flop then resets the request flip-flop in the processor so that the processor is ready again to generate the next request when the instructions and operands are available.

In order to generate the bandwidths required, the individual execution facilities are extensively staged. The input staging area timing is uniform at some multiple of 8 nanoseconds, which is a virtual processor time slot duration. Successive stages need not be. In the case of some of the small operations such as Boolean functions and fixed point add, this will necessitate the addition of an appropriate delay. As an example of staging or pipelining, the floating point adders may be staged at the output of the exponent difference, fraction justification, primary add, look ahead add, post shift, exponent up-date, and two dummy delay stages. Multiply is also naturally decomposable because of its tree structure and the use of carry-save adder stages. The fixed-point-add-subtract operation together with the Boolean function and shift operations would not normally take a full latency period. Thus, additional delay must be added in each of these areas to insure proper timing of the system. Timing must also be set by means well known to those skilled in the art such that decode enable line 575 enables the transmission of the appropriate tag decode back to the indicated virtual processor. These are, however, details of timing which need not be dwelt on at great length in this application.

Divide, being a longer operation, is not a single latency operation but may require a multiplicity of revolutions of the array in which the requesting processor is located. Therefore, in the case of a divide operation, the divide facilities set an inhibit bit in the requesting virtual processor with the acceptance of the request. This bit disables the virtual processor from initiating any new requests until one cycle before the quotient is scheduled to appear. This can be done, for example, by lines 569 and 567 which are the acceptance lines from the divide facilities. These lines are connected to OR-gate 576 having output 577 connected to AND-gates 579, 581...585. There is an AND gate for each virtual processor in the system. The respective enabling line to another input to each of the AND gates is from the acceptance lines 557, 559, 561,...,563. When a divide facility accepts the request, a decode enable signal over line 575 will allow the tag of the requesting processor to be decoded. One of the lines 557 through 563 will be enabled. Concurrently, a signal will appear on line 577. The appropriate enable line from the tag decode 516 will therefore enable one of the AND-gates 579 through 585 to activate one of the lines in the inhibit bus to the virtual processors. It will be recalled from FIG. 5 that each processor has an inhibit flip-flop 231 which is set by one of the lines from the inhibit bus. For example, line 580 of the inhibit bus sets the inhibit flip-flop in processor 0 to inhibit the sequencer of processor 0 from initiating any new instructions. The inhibit line will be extinguished one cycle before the quotient is scheduled to appear. This can be done, with reference to FIG. 6, by means within the divide functional units for decoding one cycle before the result is complete the appended tag which was originally sent to the divide unit over bus 517 and can be stored within that unit. A signal can then be sent along one of the lines 586, 587,...,588 of the Reset Inhibit Bus 590. As seen in FIG. 5, there is one of these lines for the inhibit flip-flop in every processor which thereby extinguishes the inhibit line (233 in processor 0 of FIG. 5) to allow the sequencer to initiate another instruction if ready.

Figure 7:
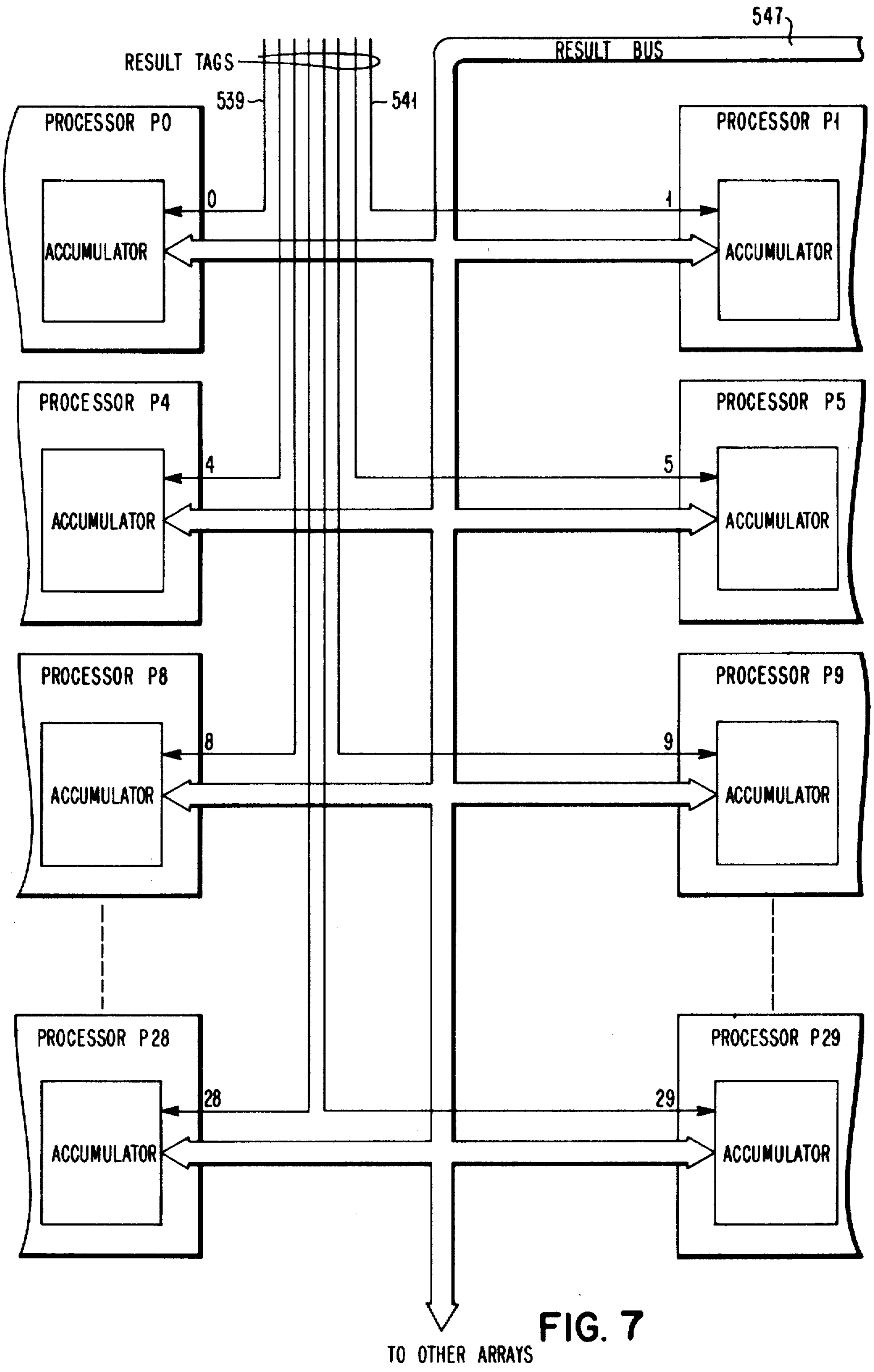
FIG. 7 is a representation of the manner in which results can be gated back to the requesting processor.

Emanating from each of the execution facilities is Results And Tag Bus 533. Results are sent over bus 547, and tags are gated via bus 535 to tag decode 537 which, again, can be a binary to one out of N-decoder. As the results are gated along Result Bus 547, the proper result tag 539, 541,...,545 is activated by tag decode 537 to inform the virtual processor which was requesting its particular function that its results are ready. This can be seen more clearly with reference to FIG. 7 where it is seen that the Result Bus 547 has an entry to the accumulator of each processor and each of the result tags serves as a gating tag to an individual processor to indicate that the results coming from the Result Bus are destined for that particular processor. An example of operation now follows.

Operation Of the Invention

Returning briefly to FIG. 1, it is assumed that each virtual processor in each array can receive instructions from main store 23 sending, for example, load/store instructions over bus 31 and receiving or transmitting operands from and to main storage. Suitable type load and store means, as well as suitable control means, not forming a part of this invention may be used.

With continued reference to FIG. 1, each virtual processor in each array is sampled for a service request outstanding in successive time slots of, for example, 8 nanoseconds each. For example, during the first 8 nanosecond time slot $P_0$ is sampled in array 0, $P_1$ is sampled in array 1, $P_2$ is sampled in array 2, and $P_3$ is sampled in array 3. During the next 8 nanosecond time slot, $P_4$ is sampled in array 0, $P_5$ is sampled in array 1, $P_6$ is sampled in array 2 and $P_7$ is sampled in array 3. Operation continues in this manner; and it can therefore be seen that during each 8 nanosecond time slot four virtual processors, one in each array, are being sampled. Since each sampling period is 8 nanoseconds and there are eight virtual processors, it takes 64 nanoseconds for each array to make 1 "revolution.' ' The way of a particular array does its sampling is seen with reference to FIG. 3.

FIG. 3 shows array 0. During the first 8 nanosecond time slot, phase 0 of ring counter 201 activates line 203 to sample $P_0$ to determine if a service request is outstanding. If there is a service request, $P_0$ Request Line 219 will be active. Therefore AND-gate 235 will activate line 236 via latch 280 to gate the operand from the $P_0$ OPERANDS BUS 220 via gate 204 to ARRAY 0 OPERANDS BUS 251. Line 236 also enables Request 0 line 102 via OR 253. Delay 281 resets latch 280 at the end of the time slot. As mentioned previously, the structure of the operands gated over bus 220 can be seen in FIG. 5.

During the second 8 nanosecond time slot, phase 1 of ring counter 201 activates line 201 to form an enabling input to AND-gate 237. If virtual processor $P_4$ of array 0 has a service request outstanding, line 221 will be active to form a second enabling input to AND-gate 237. Line 238, via latch 282, will then from a gating input to gate 206 in order to gate the operands of $P_4$ onto the array 0 operands bus 251. Line 238 also enables Request 0 line 102 through OR-gate 253. Delay 283 resets latch 282 at the end of the time slot. This cation continues with a new phase of array 0 ring counter 201 enabling its respective line every 8 nanoseconds until phase 7 is reached. At the end of phase 7, phase 0 starts over again so that a new revolution of the array is undertaken and the virtual processors are again sampled in sequence. This sampling goes on concurrently in each processor with the same relatively positioned processor in the array sampled during the same 8 nanosecond time slot in each array. Therefore it is possible that as many as four requests, one from each array, may be outstanding during a given time slot. Hence, in FIG. 2 all of the lines 102, 104, 106, and 108 could be active during the same time slot. Ties are broken by the priority apparatus of FIG. 2 in a manner explained previously relative to FIG. 2A and 2B.

An example of operation for the operands of a particular virtual processor which was given priority during a given Concurrently, the activation of line 236 activates OR-gate nanosecond time slot will now be described. With reference to FIG. 3 and 4 it is assumed that processor $P_0$ has been given actual priority in a manner similar to that explained with respect to table I or table II above. In this case, the operands of $P_0$ will have been gated over line 220 of FIG. 3 via gate 204 onto Array 0 Operands Bus 251. This was done, as explained above, by the concurrent activation of lines 203 and 219 to enable AND-gate 235 to set latch 280. The output 236 of latch 280 gates 204 to gate the operands onto bus 251. Concurrently, the activation of line 236 activates OR-gate 253 to activate request 0 line 102. It will be noted that delay $D_1$, indicated at 281 and typical for each latch in FIG. 4 is a delay which is chosen to be long enough to allow the request 0 line 102 to stay active for 8 nanoseconds before the output of delay 281 acts as a reset to the latch. This will insure that the request on line 102, typical for all arrays, will be up when the machine timing pulse proceeds down line 100 of FIG. 2 to its corresponding AND gate. Since it is assumed for this example that $P_0$ has actual priority, line 125 of FIG. 2 is active. Referring to FIG. 4 it is seen that line 125 causes a request 199 on bus 13 to be gated to the execution unit and also causes gate 271 to gate the operands from bus 251, also seen in both FIG. 3 and 4, onto the operand bus 279 which goes directly to the execution unit. Referring now to FIG. 6, it is seen that request line 199 of Request Bus 13, seen previously in FIG. 5 and also broadly in FIG. 1, activates OR-gate 504 which in turn activates enable line 506 to binary op decoder 503. Since timing is in terms of machine timing pulses assumed at an 8 nanosecond repetition rate, timing throughout the system should by synchronized, after allowing for delays in a manner well known to those of ordinary skill in the art. Hence, the gated operands will proceed down operand bus 279 where the op code portion will be gated over bus 502 to op decoder 503. The remainder of the operands, namely the tag and the data operands, will continue down bus 279 in the direction direction of the execution facilities. The op decode 503 will decode the operation indicated by the op code and activate a signal on a line to the particular execution facility indicated, which will arrive concurrently with the tags and operands from bus 279. It is well known to those skilled in the art that in a pipelined execution unit a new instruction cannot necessarily be started every new cycle. For example, as pointed out in the above article by S. F. Anderson et al., an add instruction may take four machine cycles, with a new add instruction being initiated every two machine cycles. The situation is similar with other facilities, the difference being in the number of cycles it takes to perform other functions and the number of cycles after which a new instruction can be initiated. The result of this is that a particular execution facility which is addressed may be busy. If busy, it will not accept the request. If not busy, it will accept the request. For example, assume that the op code, the request for $P_0$ under consideration, was a floating point add. Both operands and tags are gated to each execution facility 519, 521,...,531. Concurrently, the tag portion can be gated by gating means well known to those of ordinary skill in the art over bus 600 to tag decode 516. Since this is a floating point add instruction, line 505 from op decode 503 will be active to gate the operands and tag to the floating point add unit 519. If the add unit is in such a situation that it can accept a new instruction (that is, if it is not in the first two cycles of an add instruction as indicated previously) it will accept the operands and provide a signal over line 565. The tag can also be accepted and can proceed down the pipeline within an execution facility as the execution process, so as to be available at the end of execution in order to specify the virtual processor to which the results of the execution are should be sent. The signal on line 565 can be generated by logic means using ordinary skill in the art. Line 565, as well as the accept lines of all the execution facilities, is connected to OR-gate 573; and since it is activated, it in turn activates line 575 to enable the tag decode to gate out the identifier of the particular processor which was requesting service. Therefore, line 575 enables a signal to be sent, in this case, over line 557 which is an accept line to virtual processor 0. With reference back to FIG. 5, it can be seen that line 557 sets the Accept flip-flop 229 to reset Request flip-flop 223 in order to ready the virtual processor to out-gate the next request. The setting of accept flip-flop 229 allows line 227 to reset accept flip-flop 229. Enough delay $D_2$ must be present in the reset line to enable a pulse to be formed on line 227 which is wide enough to reset request flip-flop 223. If request flip-flop 223 is not reset by an acceptance, its output line 219 serves to inhibit the sequencer from insuring another instruction.

If, however the particular execution facility, in this case the floating point add unit, is busy on activation of the accept lines 565 through 572 of FIG. 6 will occur. Therefore the tag decode 516 will not be enabled and the particular virtual processor requesting service will not have its accept flip-flop set in order to reset the request flip-flop. Therefore, the request in the particular virtual processor, here virtual processor $P_0$, will remain outstanding for the next time that processor is sampled in its array.

As mentioned previously, certain operations, such as divide, require more than one "revolution" of the array, in time, for completion. Therefore, lines 569 and 567 from the divide facilities of FIG. 6 serve as enabling inputs to OR-gate 576 which causes line 575, when a divide is initiated, to send, along with the acceptance signal, an inhibit signal to the particular virtual processor requesting service. Thus, for example if $P_0$ had requested a divide, line 557 would send its ordinary acceptance to the virtual processor $P_0$, but also line 564 would form a second enabling input along with line 577 and AND-gate 579 to send an inhibit signal to processor $P_0$ over line 580. Referring back to FIG. 5, it will be seen that line 580 will set inhibit flip-flop 231 to disable the sequencer from sending a new instruction until the divide operation is complete. As can be seen from FIG. 6, one cycle before the divide facility has produced its result, a signal will be sent over reset inhibit bus 590, comprising lines 586, 587,...,588, one line for each virtual processor. The proper reset inhibit line will therefore reset the inhibit flip-flop of the particular processor, such as seen in FIG. 5 line 586, to remove the signal from line 233 and thus remove the sequencer from its disabled state. The lines of the reset inhibit bus of FIG. 6 can be generated by one of ordinary skill in the art. For example, a signal could be taken from the next to last stage of the divider facilities. Since both the operands and the tag have been supplied to the individual functional units, the particular divide functional units could have internally a binary to 1 out of N-decoder for decoding the tags resulting in the activation of the proper reset inhibit line of the bus 590, in a manner similar to that described for the tag decode 518 and the accept bus.

When results are available, both the results and the tag will be available from the particular execution facility over bus 533. The results will be sent over result bus 547 while the tags will be gated to tag decode 537. The output of tag decode 537 will be the activation of a particular one of the tags, which indicates that the results on result bus 547 are valid for the processor indicated. This can be seen from FIG. 7. The results on result bus 547 can be available at a register of each virtual processor but will be gated to only that processor whose tag is activated. For the present example, processor $P_0$ was assumed to be the processor in question and thus line 539 will gate the results into the register of processor $P_0$. The above indicates the path which a single instruction takes. Each request is sent to the execution unit under the control of priority controller 11 of FIG. 1 and 2, as explained previously.

While the invention has been particularly shown and described with reference to a preferred embodiment thereof, it will be understood by those skilled in the art that various changes in form and details may be made therein without departing from the spirit and scope of the invention.

We claim:

1. In a multiple operand stream computer system, the combination of:

an execution unit;

a plurality of arrays each containing a plurality of virtual processors and cyclically operative priority means for enabling each of said virtual processors in said arrays to time-share said execution unit.

2. The combination of claim 1 wherein said cyclically operative execution unit it pipelined.

3. The combination of claim 1 wherein said priority means includes:

first control means for periodically rotating priority among said arrays, and second control means for disabling said first control means and transferring priority to a designated array.

4. The combination of claim 2 wherein said pipelined execution unit includes:

a plurality of staged execution facilities disposed to receive operand information from said arrays, means associated with said facilities for indicating to a requesting virtual processor that its request has been accepted; and means for transmitting the results of execution back to said requesting virtual processor.

5. The combination of claim 4 wherein a first group of execution facilities executes operands at a first speed and at least one other execution facility executes operands at a speed slower than said first speed, said at least one other execution facility including means responsive to the acceptance of a request from a requesting processor for inhibiting the availability of a new request in said requesting processor until said accepting facility has substantially completed execution of said accepted request.

6. In a multiple operand stream computer system, the combination of:

an execution unit;

a plurality of arrays of virtual processors, each array having means for presenting a service request during given time periods; and priority means for selecting a service request from one of said arrays for presentation to said execution unit.

7. The combination of claim 6 wherein each array includes:

a group of virtual processors each receiving operands from a storage system and having the capability of periodically making operands available for execution;

service request means within each virtual processor for providing an indication that operands are available for execution;

a sampling means for periodically sampling each service request means; and gating means responsive to the sampling of an active service request means for gating said indication to said priority means.

8. The combination of claim 7 further including means for gating said selected service request and its associated operands to said execution unit.

9. The combination of claim 6 wherein said cyclically operative priority means includes:

cyclically operative means for rotating priority among said arrays; and logic and storage means for overriding said cyclically operative means to transfer priority to a specified array.

10. In a multiple operand stream computer system, the combination of:

a pipelined execution unit;

a plurality of arrays of virtual processors, each of said arrays capable of having associated therewith up to N virtual processors;

busing means associated with each of said arrays for transmitting operands and results from said virtual processors to said execution unit;

means associated with each array for indicating a service request to said execution unit;

ring counter means associated with each array for indicating a particular processor within said array as a candidate to transmit said indicated request and its operands to said execution unit during a given time period;

a priority ring counter associated with gating means for establishing array priority during said given time period, said selection means selecting the highest priority array having a service request outstanding during a given time period;

a first register means for indicating a particular array as having priority regardless of the priority established by said priority ring counter;

logic means responsive to signals from said priority ring counter, said service request indicating means and said first register means, said logic means generating signals to override said established priority and transfer priority to said particular array; and gating means for transmitting the results of said requested service back to said particular processor which was associated with the array having priority.

PO-1050
(5/69)

UNITED STATES PATENT OFFICE
CERTIFICATE OF CORRECTION

Patent No. 3,611,307 Dated October 5, 1971

Inventor(s) Albert Podvin et al

It is certified that error appears in the above-identified patent and that said Letters Patent are hereby corrected as shown below:

In Col. 1, line 51, change the word "multidate" to --multidata--.

In Col. 5, line 4, change the word "implant" to --implement--.

In Col. 17, line 41 and 42, delete the words beginning with "Concurrently, the activation of line 236 activates OR-gate" and substitute therefor --8--.

In Col. 18, line 55, change the word "on" to --no--.

In Col. 19, line 48, change the word "it" to --is--; and line 49, after the word said insert --cyclically operative--.

Signed and sealed this 4th day of April 1972.

(SEAL)
Attest:

EDWARD M.FLETCHER,JR.
Attesting Officer

ROBERT GOTTSCHALK
Commissioner of Patents